(12) United States Patent
Yamanaka et al.

(10) Patent No.: US 10,781,308 B2
(45) Date of Patent: Sep. 22, 2020

(54) RESIN COMPOSITION FOR LASER WELDING AND WELDED BODY THEREOF

(71) Applicants: Mitsubishi Engineering-Plastics Corporation, Minato-ku (JP); ORIENT CHEMICAL INDUSTRIES CO., LTD., Osaka-shi (JP)

(72) Inventors: Yasushi Yamanaka, Hiratsuka (JP); Makiko Yoshida, Neyagawa (JP)

(73) Assignees: Mitsubishi Engineering-Plastics Corporation, Minato-ku (JP); ORIENT CHEMICAL INDUSTRIES CO., LTD., Osaka-shi (JP)

( * ) Notice: Subject to any disclaimer, the term of this patent is extended or adjusted under 35 U.S.C. 154(b) by 221 days.

(21) Appl. No.: 16/068,291

(22) PCT Filed: Feb. 24, 2017

(86) PCT No.: PCT/JP2017/007036
§ 371 (c)(1),
(2) Date: Jul. 5, 2018

(87) PCT Pub. No.: WO2017/146196
PCT Pub. Date: Aug. 31, 2017

(65) Prior Publication Data
US 2019/0016883 A1 Jan. 17, 2019

(30) Foreign Application Priority Data
Feb. 25, 2016 (JP) ................. 2016-034474

(51) Int. Cl.
| | | |
|---|---|---|
| B32B 27/36 | (2006.01) |
| B32B 27/20 | (2006.01) |
| C08L 67/02 | (2006.01) |
| C08K 3/01 | (2018.01) |
| C08K 5/00 | (2006.01) |
| C08K 13/00 | (2006.01) |
| C08K 13/02 | (2006.01) |
| C08K 5/29 | (2006.01) |
| C08K 5/3462 | (2006.01) |
| C08L 67/00 | (2006.01) |
| C08J 5/00 | (2006.01) |
| C08K 5/08 | (2006.01) |
| B29C 65/16 | (2006.01) |
| B29C 65/00 | (2006.01) |
| B29C 65/78 | (2006.01) |
| B29C 65/82 | (2006.01) |
| B23K 26/21 | (2014.01) |

(52) U.S. Cl.
CPC ............ *C08L 67/02* (2013.01); *B23K 26/21* (2015.10); *B29C 65/1616* (2013.01); *B29C 65/1632* (2013.01); *B29C 65/1635* (2013.01); *B29C 65/1658* (2013.01); *B29C 65/1677* (2013.01); *B29C 65/7826* (2013.01); *B29C 65/8215* (2013.01); *B29C 66/1122* (2013.01); *B29C 66/1142* (2013.01); *B29C 66/43* (2013.01); *B29C 66/71* (2013.01); *B29C 66/733* (2013.01); *B29C 66/73321* (2013.01); *B29C 66/8122* (2013.01); *B29C 66/81267* (2013.01); *B29C 66/8322* (2013.01); *B29C 66/919* (2013.01); *B29C 66/929* (2013.01); *B29C 66/939* (2013.01); *B29C 66/9592* (2013.01); *C08J 5/00* (2013.01); *C08K 5/08* (2013.01); *C08K 5/29* (2013.01); *C08K 5/3462* (2013.01); *C08L 67/00* (2013.01); *C08L 2207/04* (2013.01)

(58) Field of Classification Search
None
See application file for complete search history.

(56) References Cited

U.S. PATENT DOCUMENTS

| | | | |
|---|---|---|---|
| 7,396,428 B2 | 7/2008 | Matsushima et al. |
| 7,960,003 B2 | 6/2011 | Kihara et al. |
| 7,960,012 B2 | 6/2011 | Kihara et al. |

(Continued)

FOREIGN PATENT DOCUMENTS

| | | |
|---|---|---|
| EP | 3248757 A1 | 11/2017 |
| JP | 2003-292752 A | 10/2003 |

(Continued)

OTHER PUBLICATIONS

International Search Report dated Apr. 11, 2017, in PCT/JP2017/007036, filed Feb. 24, 2017.

(Continued)

*Primary Examiner* — Michael J Feely
(74) *Attorney, Agent, or Firm* — Oblon, McClelland, Maier & Neustadt, L.L.P.

(57) ABSTRACT

A resin composition for laser welding contains:
relative to 100 mass parts of (A) a thermoplastic polyester resin material that contains a polybutylene terephthalate homopolymer and at least one of a polybutylene terephthalate copolymer, a polyethylene terephthalate resin, and a polycarbonate resin, 0.0005 to 0.5 mass parts of (B) nigrosine; and 0.01 to 2 mass parts of (C) a colorant containing at least an anthraquinone dye C1 having a maximum absorption wavelength in a range of 590 to 635 nm, a perinone dye C2 having a maximum absorption wavelength in a range of 460 to 480 nm, and an anthraquinone dye C3 having a maximum absorption wavelength in a range of 435 to 455 nm, at C1:C2:C3=24 to 41:24 to 39:22 to 46 as the mass ratio relative to 100 mass parts for a total of C1, C2, and C3.

12 Claims, 2 Drawing Sheets

(56) References Cited

U.S. PATENT DOCUMENTS

| | | | |
|---|---|---|---|
| RE44,045 E * | 3/2013 | Kihara | B29O 66/4322 |
| | | | 428/57 |
| RE44,290 E * | 6/2013 | Kihara | B29O 66/43 |
| | | | 428/174 |
| 2003/0045618 A1 | 3/2003 | Koshida et al. | |
| 2003/0088076 A1 | 5/2003 | Koshida et al. | |
| 2005/0119377 A1 | 6/2005 | Ishii et al. | |
| 2005/0137325 A1 * | 6/2005 | Koshida | B29O 65/1635 |
| | | | 524/601 |
| 2005/0165176 A1 | 7/2005 | Matsushima et al. | |
| 2005/0228085 A1 | 10/2005 | Koshida et al. | |
| 2009/0136717 A1 | 5/2009 | Kiahra T et al. | |
| 2019/0002692 A1 * | 1/2019 | Okamoto | B29O 65/1635 |

FOREIGN PATENT DOCUMENTS

| | | | |
|---|---|---|---|
| JP | 3510817 B2 | 3/2004 |
| JP | 2004-514007 A | 5/2004 |
| JP | 2004-315805 A | 11/2004 |
| JP | 2004-534104 A | 11/2004 |
| JP | 2005-187798 A | 7/2005 |
| JP | 2008-1112 A | 1/2008 |
| JP | 2008-105430 A | 5/2008 |
| JP | 4641377 B2 | 3/2011 |
| JP | 2013-155278 A | 8/2013 |
| JP | 2013-155279 A | 8/2013 |
| JP | 2016-155939 A | 9/2016 |
| WO | WO 02/38662 A1 | 5/2002 |
| WO | WO 2007/034970 A1 | 3/2007 |

OTHER PUBLICATIONS

Extended European Search Report dated Jun. 21, 2019 in European Patent Application No. 17756630.4, 6 pages.

* cited by examiner

[Fig. 1]
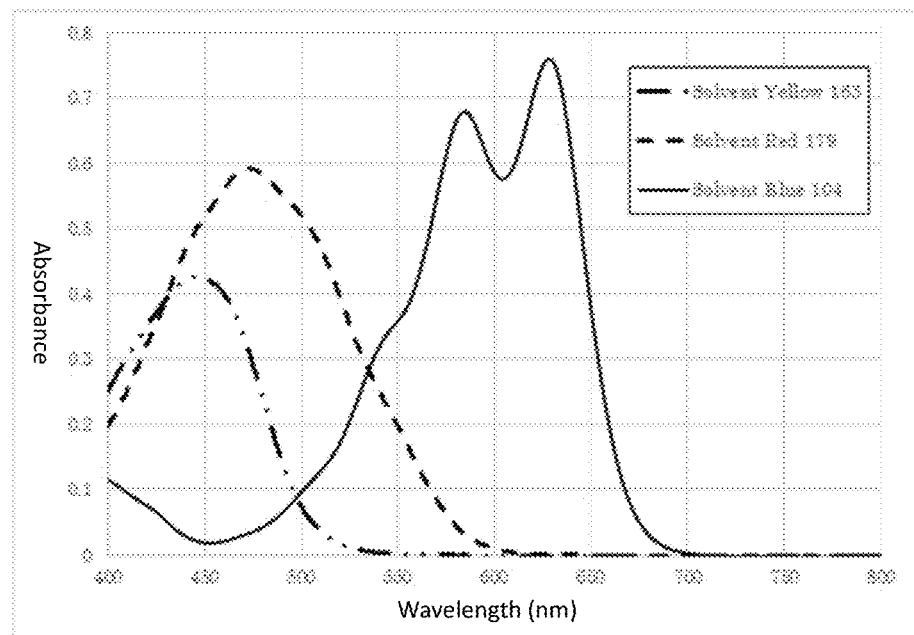
[Fig. 2]
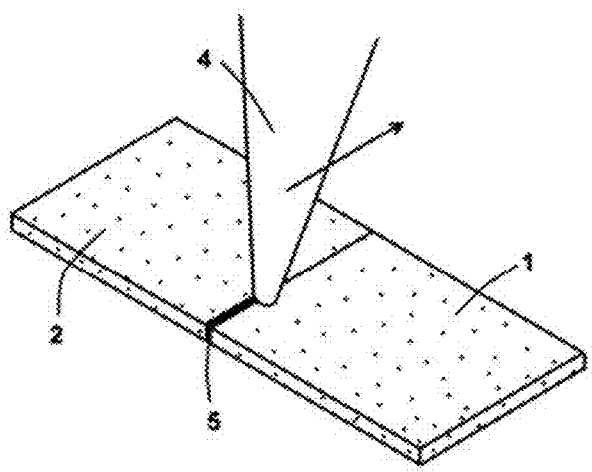

[Fig. 3]
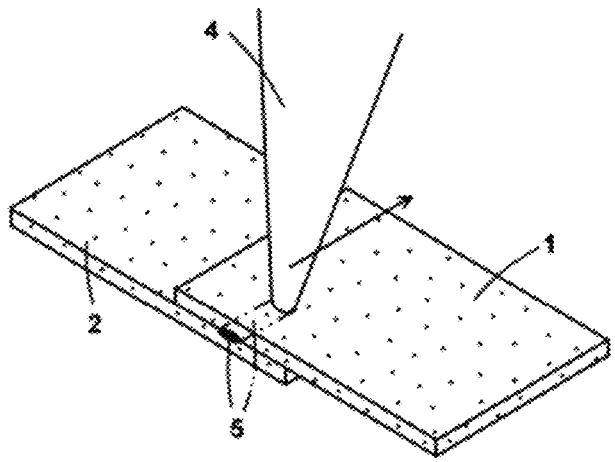
[Fig. 4]
Enlargement of Area A
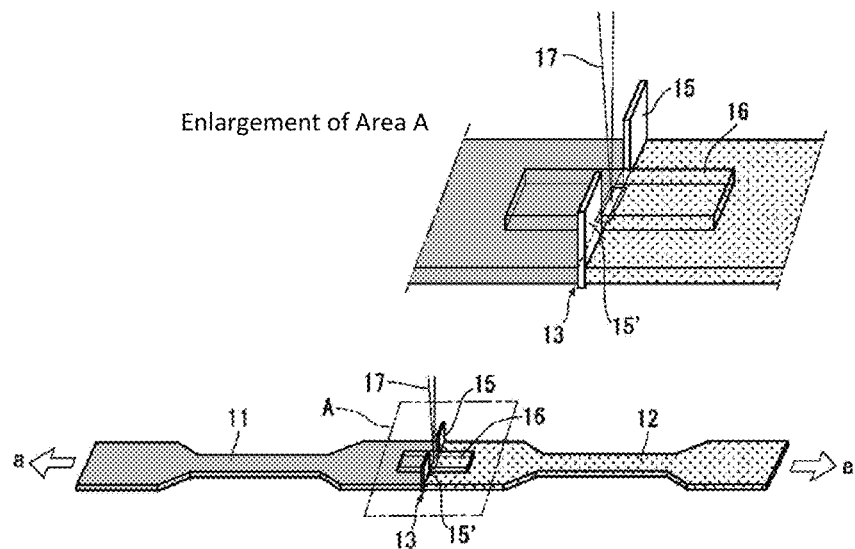
[Fig. 5]
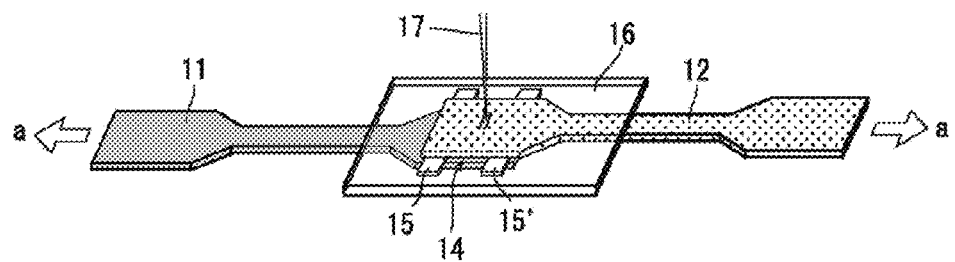

RESIN COMPOSITION FOR LASER WELDING AND WELDED BODY THEREOF

TECHNICAL FIELD

The present invention relates to a resin composition for laser welding and to a welded body, and is a polyester resin composition for laser welding, for which the black tinctorial power is excellent, which has an excellent resistance to thermal discoloration and an excellent laser welding processability, and which provides a high weld strength for the welded body provided by the laser welding of a molded article obtained from the resin composition for laser welding.

BACKGROUND ART

Thermoplastic polyester resins exhibit an excellent mechanical strength, chemical resistance, and electrical insulation characteristics and also have an excellent heat resistance, moldability, and recycling characteristics, and as a consequence are widely used in a variety of equipment and instrument components.

The weight reduction in particular of automotive components has been progressing in recent years, and high levels of heat resistance are often required due to the conversion to plastic of components for which metal has previously been used and due to the downsizing of plastic products. As a consequence, reinforced thermoplastic resins that incorporate a filler such as glass fiber are frequently used, among which thermoplastic polyester resins, e.g., of polybutylene terephthalate, offer an excellent mechanical strength and moldability and are widely used as, for example, cases for automotive electronic components and housings for motor components.

In addition, examples wherein welding processing is carried out in order to improve the production efficiency have been increasing quite recently, and here laser welding, which has little effect on electronic components, has frequently been used.

However, as compared to polycarbonate resins and polystyrene resins, polyester resins have had a relatively lower laser permeability and warpage has more readily appeared in the molded article therefrom, and as a consequence the weld strength has often been unsatisfactory.

When warpage occurs in a molded article, a method may also be adopted in which a pressing force is applied during welding so as to counterbalance the warpage; however, depending on the shape of the molded article, it is often also difficult to efficiently apply this pressing force. In addition, since residual stress remains in the welded body from which the pressing force has been released after welding, the problem arises that it is then difficult to obtain a high weld strength.

The following, for example, have been proposed in order to improve the laser weldability of polyester resins: a method that uses a polybutylene terephthalate copolymer (PTL 1), methods wherein a polycarbonate resin or styrene resin is alloyed with polybutylene terephthalate (PTL 2 and PTL 3), and a method wherein a specific oligomer is added (PTL 4).

However, these methods have not provided a satisfactory weldability due to, for example, gaps between the weld members produced by, for example, warp deformation of the molded articles.

A method has also been proposed wherein the weldability is improved by the addition of a laser transmission absorber, e.g., nigrosine, to thermoplastic resin (PTL 5); however, a polyester resin composition suitable for laser welding is not described.

CITATION LIST

Patent Literature

[PTL 1] Japanese Patent No. 3510817
[PTL 2] Japanese Patent Application Laid-open No. 2003-292752
[PTL 3] Japanese Patent No. 4641377
[PTL 4] Japanese Patent Application Laid-open No. 2004-315805
[PTL 5] Japanese Patent Application Laid-open No. 2008-1112

SUMMARY OF INVENTION

Technical Problem

An object of the present invention is to provide a polyester resin composition for laser welding, that has an excellent laser welding processability, an excellent black tinctorial power, and an excellent thermal discoloration resistance, and that gives an excellent weld strength in the welded body provided by laser welding.

Solution to Problem

The present inventors discovered that the aforementioned problem could be solved by the use, in a specific thermoplastic polyester resin material, of a combination of nigrosine with a special colorant, and achieved the present invention based on this discovery.

The present invention relates to the resin composition for laser welding, the molded article for laser welding, and the laser-welded body that are described in the following.

[1] A resin composition for laser welding comprising:
relative to 100 mass parts of (A) a thermoplastic polyester resin material that contains a polybutylene terephthalate homopolymer and at least one of a polybutylene terephthalate copolymer, a polyethylene terephthalate resin, and a polycarbonate resin,
0.0005 to 0.5 mass parts of (B) nigrosine; and
0.01 to 2 mass parts of (C) a colorant containing at least an anthraquinone dye C1 having a maximum absorption wavelength in a range of 590 to 635 nm, a perinone dye C2 having a maximum absorption wavelength in a range of 460 to 480 nm, and an anthraquinone dye C3 having a maximum absorption wavelength in a range of 435 to 455 nm, at C1:C2:C3=24 to 41:24 to 39:22 to 46 as the mass ratio relative to 100 mass parts for a total of C1, C2, and C3.

[2] The resin composition for laser welding according to the preceding [1], wherein (C) colorant is a colorant that contains the perinone dye C2 having the maximum absorption wavelength in the range of 460 to 480 nm and the anthraquinone dye C1 having the maximum absorption wavelength in the range of 590 to 635 nm, in a proportion of C2/C1=0.61 to 1.50 as the mass ratio between the two.

[3] The resin composition for laser welding according to the preceding [1] or [2], wherein (A) thermoplastic polyester resin material contains a polybutylene terephthalate homopolymer and a polybutylene terephthalate copolymer and the content of the polybutylene terephthalate copolymer is 5 to 70 mass % relative to 100 mass % for a total of the two.

[4] The resin composition for laser welding according to the preceding [1] or [2], wherein (A) thermoplastic polyester resin material contains a polybutylene terephthalate homopolymer and a polyethylene terephthalate resin, and the content of the polyethylene terephthalate resin is 5 to 50 mass % relative to 100 mass % for the total of the two.

[5] The resin composition for laser welding according to the preceding [1] or [2], wherein (A) thermoplastic polyester resin material contains a polybutylene terephthalate homopolymer and a polycarbonate resin, and the content of the polycarbonate resin is 5 to 50 mass % relative to 100 mass % for a total of the polybutylene terephthalate homopolymer and polycarbonate resin.

[6] The resin composition for laser welding according to any of the preceding [1] to [5], which has a converted absorbance a of 0.05 to 1 for 940 nm laser for a 1 mm-thick molded plate made from the resin composition.

[7] The resin composition for laser welding according to any of the preceding [1] to [6], which has an incidence ratio K of 20% to 80% for 940 nm laser for a 1 mm-thick molded plate made from the resin composition, where the incidence ratio $K$ (%)=100−transmittance−reflectance.

[8] A molded article for laser welding comprising the resin composition for laser welding according to any of the preceding [1] to [7].

[9] A laser-welded body of the molded article according to the preceding [8].

[10] The laser-welded body according to the preceding [9], wherein a gap between molded articles at the time of welding is at least 0.1 mm for at least a welded portion in the welded body.

[11] The laser-welded body according to the preceding [9] or [10], wherein the molded articles are butt-welded to each other.

[12] The laser-welded body according to the preceding [9] or [10], wherein the molded articles are lap-welded to each other.

Advantageous Effects of Invention

The resin composition for laser welding according to the present invention has an excellent black tinctorial power, an excellent resistance to thermal discoloration, and an advantageous laser welding processability, while the welded body provided by the laser welding of molded articles of the resin composition has an excellent weld strength, an excellent black coloration, and an excellent resistance to thermal discoloration.

BRIEF DESCRIPTION OF DRAWINGS

FIG. 1 is an ultraviolet-visible spectrum of the individual dyes used in Colorant Production Example 1.

FIG. 2 is a diagram that shows an example of an embodiment of the production of a laser-welded body by abutting a plurality of molded articles and carrying out laser welding.

FIG. 3 is a diagram that shows an example of an embodiment of the production of a laser-welded body by overlapping a plurality of molded articles and carrying out laser welding.

FIG. 4 is a schematic diagram that shows the butt laser welding method in the examples.

FIG. 5 is a schematic diagram that shows the lap-welding method in the examples.

DESCRIPTION OF EMBODIMENTS

Embodiments of the present invention are described in detail in the following, but the scope of the present invention is not limited to or by these embodiments. In the Description of this application, the "to" used in numerical value ranges is used in the sense that the numerical values provided therebefore and thereafter are included as the lower limit value and the upper limit value.

The resin composition of the present invention for laser welding is a resin composition comprises containing:

relative to 100 mass parts of (A) a thermoplastic polyester resin material that contains a polybutylene terephthalate homopolymer and at least one of a polybutylene terephthalate copolymer, a polyethylene terephthalate resin, and a polycarbonate resin, 0.0005 to 0.5 mass parts of (B) nigrosine; and 0.01 to 2 mass parts of (C) a colorant containing at least an anthraquinone dye C1 having a maximum absorption wavelength in a range of 590 to 635 nm, a perinone dye C2 having a maximum absorption wavelength in a range of 460 to 480 nm, and an anthraquinone dye C3 having a maximum absorption wavelength in a range of 435 to 455 nm, at C1:C2:C3=24 to 41:24 to 39:22 to 46 as the mass ratio relative to 100 mass parts for a total of C1, C2, and C3.

[Nigrosine (B)]

The resin composition of the present invention for laser welding contains nigrosine (B).

Nigrosine acts as a dye that has laser absorptivity and has a modest absorption in the range of laser from 800 nm to 1,200 nm.

Nigrosine is a black azine-type condensation mixture as described in the Color Index for C. I. Solvent Black 5 and C. I. Solvent Black 7. It can be synthesized, for example, by the oxidation and dehydration condensation of aniline, aniline hydrochloride, and nitrobenzene in the presence of iron chloride at a reaction temperature of 160° C. to 190° C. An example of a commercially available nigrosine product is the "NUBIAN (registered trademark) BLACK series" (product name, Orient Chemical Industries Co., Ltd.) or the like.

The content of the nigrosine (B), per 100 mass parts of the thermoplastic polyester resin material (A), is 0.0005 to 0.5 mass parts, and an advantageous condition that enables control of the amount of heat generation is 0.001 to 0.1 mass parts, more preferably 0.003 to 0.05 mass parts, and still more preferably 0.005 to 0.03 mass parts.

This content is the amount per 100 mass parts of the total of the resins when, as described below, the thermoplastic polyester resin material (A) also contains polycarbonate resin and/or aromatic vinyl resin.

It is possible to balance both the transmittance and reflectance of the molded article by, for example, adjusting the nigrosine content into the indicated range. This is defined by the incidence ratio in the present invention.

The incidence ratio K of the resin composition for laser welding can be set to 20%-80%, preferably 25%-75% and particularly preferably 30%-70%. The incorporation of nigrosine makes possible improvements in the black tinctorial power and improvements in the surface appearance and smoothness of the molded article and improves the laser weldability.

The incidence ratio K (unit: %) is defined by the following formula.

Incidence ratio $K$ (%)=100−transmittance−reflectance

The incidence ratio K is the incidence ratio for laser at a wavelength of 940 nm using a 1 mm-thick molded article.

For an ASTM No. 4 dumbbell (1 mm) molded article, it is derived from the results for the transmittance and reflectance measured at a position on the opposite side to the gate (position that is on the opposite side to the gate where the resin is injected). This molded article is produced using the following conditions: cylinder temperature=255° C., mold temperature=65° C., injection velocity=100 mm/sec, injection rate, described below=66 cm$^3$/sec, and surface progression factor, described below =880 cm$^3$/sec·cm.

For a two-step plate (length 80 mm×width 50 mm×thickness 1.5 mm and 1 mm, the gate area is the 1.5 mm-thick side), the incidence ratio K is derived from the results for the transmittance and reflectance measured at the 1 mm-thick position that is the opposite side to the gate. This molded article is produced using the following conditions: cylinder temperature=260° C., mold temperature=80° C., injection velocity=120 mm/sec, injection rate=51 cm$^3$/sec, and surface progression factor=405 cm$^3$/sec·cm.

The resin composition for laser welding may also contain other laser-absorptive dyes or laserabsorbers in an effective range at which the present invention can be executed.

[Colorant (C)]

The colorant (C) used in the resin composition for laser welding of the present invention contains at least an anthraquinone dye C1 having the maximum absorption wavelength in the range of 590 to 635 nm, a perinone dye C2 having the maximum absorption wavelength in the range of 460 to 480 nm, and an anthraquinone dye C3 having the maximum absorption wavelength in the range of 435 to 455 nm, at C1:C2:C3=24 to 41:24 to 39:22 to 46 as the mass ratio relative to 100 mass parts for the total of C1, C2, and C3.

This maximum absorption wavelength is defined as the wavelength that exhibits the maximum absorption in the absorption spectrum measured using an ultraviolet-visible spectrophotometer on the solution prepared by dissolution in dimethylformamide (DMF).

The colorant (C) must be a combination of dyes that exhibit absorption in the visible region, have a good compatibility with the thermoplastic polyester resin material (A), and exhibit little scattering behavior for laser, and desirably has an excellent heat resistance and resists discoloration even upon exposure to the high temperatures during melt molding of the resin.

The anthraquinone dye C1 having its maximum absorption wavelength in the range of 590 to 635 nm used for the colorant (C) of the present invention is generally a blue oil-soluble dye. By using this dye in the present invention, for example, the visibility is higher than for a green anthraquinone dye and, even when a black mixed dye is combined, a colorant exhibiting a black color with a excellent black tinctorial power can be obtained by subtractive color mixing method by the combination with a red dye and a yellow dye.

The anthraquinone dye C1 having its maximum absorption wavelength in the range from 590 to 635 nm is preferably selected from those having a value (decomposition onset temperature) of at least 300° C. as measured in air with a TG/DTA thermogravimetric analyzer.

Examples of preferred anthraquinone dyes C1 are C. I. Solvent Blue 97 (decomposition onset temperature=320° C.) and C. I. Solvent Blue 104 (decomposition onset temperature=320° C.) as described in the Color Index. One or two or more of these may be used. However, when the compounding amount becomes large, bleed out from the molded article readily occurs in high-temperature atmospheres and the resistance to thermal discoloration assumes a trend of deterioration.

Commercially available anthraquinone dyes C1 are, for example, the "NUBIAN (registered trademark) BLUE series" and the "OPLAS (registered trademark) BLUE series" (both are product names, Orient Chemical Industries Co., Ltd.).

The perinone dye C2 with maximum absorption wavelength in the range of 460 to 480 nm is used in combination with the aforementioned anthraquinone dye C1 for the colorant (C) in the present invention. These are generally red oil-soluble dyes. Such a perinone dye C2 can be specifically exemplified by C. I. Solvent Red 135, 162, 178, and 179. One or two or more of these may be used. However, when the compounding amount becomes large, bleed out from the molded article readily occurs in high-temperature atmospheres and the resistance to thermal discoloration assumes a trend of deterioration.

Commercially available forms of the red perinone dye C2 are, for example, the "NUBIAN (registered trademark) RED series" and the "OPLAS (registered trademark) RED series" (both are product names, Orient Chemical Industries Co., Ltd.).

A highly heat-resistant anthraquinone dye C3 with a maximum absorption wavelength in the range of 435 to 455 nm is used in combination in the present invention with the aforementioned dyes C1 and C2. The anthraquinone dye C3 with a maximum absorption wavelength in the range of 435 to 455 nm is generally a yellow oil-soluble dye.

Specific examples of the anthraquinone dye C3 with a maximum absorption wavelength in the range of 435 to 455 nm are C. I. Solvent Yellow 163 and C. I. Vat Yellow 1, 2, and 3. One or two or more of these may be used. However, when the compounding amount becomes large, bleed out from the molded article readily occurs in high-temperature atmospheres and the resistance to thermal discoloration assumes a trend of deterioration.

Commercially available yellow anthraquinone dyes for this anthraquinone dye C3 can be exemplified by the "NUBIAN (registered trademark) YELLOW series" and "OPLAS (registered trademark) YELLOW series" (both are product names, Orient Chemical Industries Co., Ltd.).

The colorant (C) used in the present invention uses the anthraquinone dye C1 with a maximum absorption wavelength in the range of 590 to 635 nm, the perinone dye C2 with a maximum absorption wavelength in the range of 460 to 480 nm, and the anthraquinone dye C3 with a maximum absorption wavelength in the range of 435 to 455 nm; however, because the hue of the nigrosine (B) and the oil-soluble dyes constituting the colorant (C) varies depending on the compatibility with the polybutylene terephthalate homopolymer, control of the proportions of the oil-soluble dyes constituting the colorant (C) is required in order to obtain a molded plate with a suitable jet black for the black hue. Due to this, the content proportions for C1, C2, and C3 are C1:C2:C3=24 to 41:24 to 39:22 to 46 as the mass ratio (based on 100 mass parts for the total of C1, C2, and C3). The preferred ratio for C1:C2:C3 is 28 to 41:24 to 39:24 to 46.

Moreover, the colorant (C) in the present invention is preferably a colorant containing the perinone dye C2 with a maximum absorption wavelength in the range of 460 to 480 nm and the anthraquinone dye C1 with a maximum absorption wavelength in the range of 590 to 635 nm, in a proportion of C2/C1=0.61 to 1.50 as the mass ratio between the two. 0.62 to 1.15 is more preferred when the chromogenicity by the resin composition of the present invention and the inhibition of bleed out are considered.

The content of the colorant (C), per 100 mass parts of the thermoplastic polyester resin material (A), is 0.01 to 2 mass parts, preferably 0.05 to 0.8 mass parts, and more preferably 0.1 to 0.6 mass parts. A resin composition for laser welding having a excellent black tinctorial power can be obtained by adjusting the colorant content to the indicated range.

The colorant (C) may contain an additional dye other than the C1, C2, and C3 described above, and this additional dye can be exemplified by dyes such as azo dyes, quinacridone dyes, dioxazine dyes, quinophthalone dyes, perylene dyes, perinone dyes (compounds with a wavelength different from the aforementioned C2), isoindolinone dyes, azomethine dyes, triphenylmethane dyes, and anthraquinone dyes (compounds with wavelengths different from the aforementioned C1 and C3).

[Thermoplastic Polyester Resin Material (A)]

The thermoplastic polyester resin material (A) contained in the resin composition for laser welding of the present invention contains a polybutylene terephthalate homopolymer (A1) and at least one of a polybutylene terephthalate copolymer (A2a), a polyethylene terephthalate resin (A2b), and a polycarbonate resin (A2c).

<Polybutylene Terephthalate Homopolymer (A1)>

The polybutylene terephthalate homopolymer (A1) used in the thermoplastic polyester resin material (A) of the present invention is a polymer obtained by polycondensation of terephthalic acid as the acid component and 1,4-butanediol as the alcohol component.

The intrinsic viscosity of the polybutylene terephthalate homopolymer (A1) is preferably 0.5 to 2 dl/g. Viewed in terms of the moldability and mechanical characteristics, a polybutylene terephthalate homopolymer (A1) having an intrinsic viscosity in the range of 0.6 to 1.5 dl/g is preferred. When a polybutylene terephthalate homopolymer (A1) having an intrinsic viscosity lower than 0.5 dl/g is used, the resulting welding member readily assumes a low mechanical strength. At above 2 dl/g, the thermoplastic polyester resin material (A) has a poor flowability and the moldability then deteriorates, and the laser weldability may also decline.

The intrinsic viscosity is the value measured at 30° C. in a mixed solvent of tetrachloroethane and phenol at 1:1 (mass ratio).

The amount of terminal carboxyl group in the polybutylene terephthalate homopolymer (A1) may be determined by selection as appropriate, but generally is not more than 60 eq/ton and is preferably not more than 50 eq/ton and is more preferably not more than 30 eq/ton. The generation of gas during melt molding of the thermoplastic polyester resin material (A) is facilitated at above 50 eq/ton. While the lower limit value for the amount of terminal carboxyl group is not particularly limited, it is generally 5 eq/ton.

The amount of terminal carboxyl group in the polybutylene terephthalate homopolymer (A1) is the value determined by dissolving 0.5 g of the resin in 25 mL of benzyl alcohol and performing titration using a benzyl alcohol solution of 0.01 mol/l sodium hydroxide. The amount of terminal carboxyl group may be adjusted using any heretofore known method, e.g., methods wherein reaction with an terminating agent is carried out and methods wherein the polymerization conditions—e.g., the starting material charge ratio at polymerization, the polymerization temperature, and the pressure-reduction process—are adjusted.

<Polybutylene Terephthalate Copolymer (A2a)>

The polybutylene terephthalate copolymer (A2a) used in the thermoplastic polyester resin material (A) is a polymer in which, in addition to terephthalic acid and 1,4-butanediol, preferably, for example, isophthalic acid, dimer acid, and a polyalkylene glycol such as polytetramethylene glycol (PTMG), is or are copolymerized.

In the case of use of a polybutylene terephthalate copolymer (A2a) in which polytetramethylene glycol is copolymerized, the proportion of the tetramethylene glycol component in the copolymer is preferably 3 to 40 mass %, more preferably 5 to 30 mass %, and still more preferably 10 to 25 mass %. A trend of an excellent balance between the laser weldability and the heat resistance is provided by the use of these copolymerization proportions, which is thus preferred.

When a dimer acid-copolymerized polybutylene terephthalate is used as the polybutylene terephthalate copolymer (A2a), the proportion of the dimer acid component in the overall carboxylic acid component is, as the carboxylic acid group, preferably 0.5 to 30 mol %, more preferably 1 to 20 mol %, and still more preferably 3 to 15 mol %. A trend of an excellent balance among the laser weldability, long-term heat resistance, and toughness is provided by the use of these copolymerization proportions, which is thus preferred.

When an isophthalic acid-copolymerized polybutylene terephthalate is used as the polybutylene terephthalate copolymer (A2a), the proportion of the isophthalic acid component in the overall carboxylic acid component is, as the carboxylic acid group, preferably 1 to 30 mol %, more preferably 1 to 20 mol %, and still more preferably 3 to 15 mol %. A trend of an excellent balance among the laser weldability, heat resistance, injection moldability, and toughness is provided by the use of these copolymerization proportions, which is thus preferred.

Among the preceding copolymers, the polytetramethylene glycol-copolymerized copolybutylene terephthalate and isophthalic acid-copolymerized polybutylene terephthalate are preferred for the polybutylene terephthalate copolymer (A2a).

The intrinsic viscosity of the polybutylene terephthalate copolymer (A2a) is preferably 0.5 to 2 dl/g. A polybutylene terephthalate copolymer (A2a) having an intrinsic viscosity in the range of 0.6 to 1.5 dl/g is preferred from the standpoint of the moldability and mechanical properties. A low mechanical strength for the obtained resin composition is facilitated when a polybutylene terephthalate copolymer (A2a) having an intrinsic viscosity below 0.5 dl/g is used. At above 2 dl/g, the flowability of the resin composition becomes poor and the moldability then deteriorates, and the laser weldability may also decline.

The intrinsic viscosity is the value measured at 30° C. in a mixed solvent of tetrachloroethane and phenol at 1:1 (mass ratio).

The amount of terminal carboxyl group in the polybutylene terephthalate copolymer (A2a) may be determined by selection as appropriate, but generally is not more than 60 eq/ton and is preferably not more than 50 eq/ton and is more preferably not more than 30 eq/ton. The generation of gas during melt molding of the resin composition is facilitated at above 50 eq/ton. While the lower limit value for the amount of terminal carboxyl group is not specifically established, it is generally 5 eq/ton.

The amount of terminal carboxyl group in the polybutylene terephthalate copolymer (A2a) is the value measured by dissolving 0.5 g of the resin in 25 mL of benzyl alcohol and performing titration using a benzyl alcohol solution of 0.01 mol/l sodium hydroxide. The amount of terminal carboxyl group may be adjusted using any heretofore known method, e.g., methods wherein reaction with an terminating agent is carried out and methods wherein the polymerization conditions—e.g., the starting material charge ratio at polymerization, the polymerization temperature, and the pressure-reduction process—are adjusted.

When the polybutylene terephthalate homopolymer (A1) and polybutylene terephthalate copolymer (A2a) are used as the thermoplastic polyester resin material (A) in the present invention, the content of the polybutylene terephthalate copolymer (A2a), relative to 100 mass % for the total of (A1) and (A2a), is preferably 5 to 70 mass % polybutylene terephthalate copolymer (A2a), more preferably 10 to 65 mass %, still more preferably 20 to 60 mass %, and particularly preferably 30 to 55 mass %. The content for the polybutylene terephthalate copolymer (A2a) of less than 5 mass % facilitates a decline in the laser transmittance and the laser weld strength, while a decline in the moldability is facilitated at above 70 mass %.

<Polyethylene Terephthalate Resin (A2b)>

The polyethylene terephthalate resin (A2b) used in the thermoplastic polyester resin material (A) is a resin wherein the main constituent unit, with reference to the overall constituent repeat units, is the oxyethyleneoxyterephthaloyl unit from terephthalic acid and ethylene glycol, and constituent repeat units other than the oxyethyleneoxyterephthaloyl unit may also be contained. The polyethylene terephthalate resin is produced using ethylene glycol and terephthalic acid or a lower alkyl ester thereof as the main starting materials, but another acid component and/or another glycol component may also be used as a starting material.

The acid component other than terephthalic acid can be exemplified by dicarboxylic acids and derivatives thereof, e.g., phthalic acid, isophthalic acid, naphthalenedicarboxylic acid, 4,4'-diphenyl sulfone dicarboxylic acid, 4,4'-biphenyldicarboxylic acid, 1,4-cyclohexanedicarboxylic acid, 1,3-phenylenedioxydiacetic acid and its structural isomers, malonic acid, succinic acid, and adipic acid, and by oxyacids and derivatives thereof, e.g., p-hydroxybenzoic acid and glycolic acid.

The diol component other than ethylene glycol can be exemplified by aliphatic glycols, e.g., 1,2-propanediol, 1,3-propanediol, 1,4-butanediol, pentamethylene glycol, hexamethylene glycol, and neopentyl glycol; alicyclic glycols, e.g., cyclohexanedimethanol; and aromatic dihydroxy compound derivatives, e.g., bisphenol A and bisphenol S.

In addition, the polyethylene terephthalate resin may have copolymerized therein not more than 1.0 mol %, preferably not more than 0.5 mol %, and more preferably not more than 0.3 mol % of a branching component, for example, a trifunctional acid, e.g., tricarballylic acid, trimesic acid, and trimellitic acid; a tetrafunctional acid having an ester-forming capability, e.g., pyromellitic acid; or a trifunctional or tetrafunctional alcohol having an ester-forming capability, e.g., glycerol, trimethylolpropane, and pentaerythritol.

The intrinsic viscosity of the polyethylene terephthalate resin (A2b) is preferably 0.3 to 1.5 dl/g, more preferably 0.3 to 1.2 dl/g, and particularly preferably 0.4 to 0.8 dl/g.

The intrinsic viscosity of the polyethylene terephthalate resin is the value measured at 30° C. in a mixed solvent of tetrachloroethane and phenol at 1:1 (mass ratio).

The concentration of terminal carboxyl group in the polyethylene terephthalate resin (A2b) is 3 to 60 eq/ton, wherein 5 to 50 eq/ton is preferred and 8 to 40 eq/ton is more preferred. By having the terminal carboxyl group concentration be not more than 50 eq/ton, the generation of gas during melt molding of the resin material is suppressed and an improving trend is assumed for the mechanical properties of the obtained member for laser welding. Conversely, by having the terminal carboxyl group concentration be at least 3 eq/ton, an improving trend is assumed for the heat resistance, residence heat stability, and hue of the member for laser welding, and this is thus preferred.

The terminal carboxyl group concentration in the polyethylene terephthalate resin is the value determined by dissolving 0.5 g of the polyethylene terephthalate resin in 25 mL of benzyl alcohol and performing titration using a benzyl alcohol solution of 0.01 mol/l sodium hydroxide.

The amount of terminal carboxyl group may be adjusted using any heretofore known method, e.g., methods wherein reaction with an terminating agent is carried out and methods wherein the polymerization conditions—e.g., the starting material charge ratio at polymerization, the polymerization temperature, and the pressure-reduction process—are adjusted.

When the polybutylene terephthalate homopolymer (A1) and polyethylene terephthalate resin (A2b) are used as the thermoplastic polyester resin material (A), the content of the polyethylene terephthalate resin (A2b), relative to 100 mass % for the total of (A1) and (A2b), is preferably 5 to 50 mass %, more preferably 10 to 45 mass %, and still more preferably 15 to 45 mass %. The content for the polyethylene terephthalate resin of less than 5 mass % facilitates a decline in the laser transmissivity and the laser weld strength, while a decline in the moldability is facilitated at above 50 mass %.

<Polycarbonate Resin (A2c)>

The polycarbonate resin (A2c) used in the thermoplastic polyester resin material (A) is a possibly branched thermoplastic polymer or copolymer obtained by the reaction, with phosgene or a carbonate diester, of a dihydroxy compound or a dihydroxy compound plus a small amount of a polyhydroxy compound. The polycarbonate resin production method is not particularly limited, and a polycarbonate resin produced by a heretofore known phosgene method (interfacial polymerization method) or melt method (transesterification method) can be used; however, polycarbonate resin produced by a melt polymerization method is preferred from the standpoints of the laser transmissivity and laser weldability.

The starting dihydroxy compound is preferably an aromatic dihydroxy compound, e.g., 2,2-bis(4-hydroxyphenyl) propane (i.e., bisphenol A), tetramethylbisphenol A, bis(4-hydroxyphenyl)-p-diisopropylbenzene, hydroquinone, resorcinol, and 4,4-dihydroxydiphenyl, with bisphenol A being preferred. Also usable are compounds wherein at least one tetraalkylphosphonium sulfonate is bonded to the aforementioned aromatic dihydroxy compound.

Among the preceding, the polycarbonate resin (A2c) is preferably an aromatic polycarbonate resin derived from 2,2-bis(4-hydroxyphenyl)propane or an aromatic polycarbonate copolymer derived from 2,2-bis(4-hydroxyphenyl) propane and another aromatic dihydroxy compound. It may also be a copolymer, for example, a copolymer with a polymer or oligomer having a siloxane structure. In addition, a mixture of two or more of these polycarbonate resins may be used.

The viscosity-average molecular weight of the polycarbonate resin (A2c) is preferably 5,000 to 30,000, more preferably 10,000 to 28,000, and still more preferably 14,000 to 24,000. The use of a polycarbonate resin (A2c) having a viscosity-average molecular weight of less than 5,000 facilitates the occurrence of a low mechanical strength in the obtained member for laser welding. At above 30,000, the flowability of the resin composition is degraded and the moldability then deteriorates, and the laser weldability may also be reduced.

The viscosity-average molecular weight of the polycarbonate resin is the viscosity-average molecular weight [Mv] converted from the solution viscosity measured at a temperature of 25° C. using methylene chloride as the solvent.

The ratio (Mw/Mn) between the mass-average molecular weight Mw and the number-average molecular weight Mn of the polycarbonate resin (A2c), measured by gel permeation chromatography (GPC) in terms of polystyrene, is preferably 2 to 5 and more preferably 2.5 to 4. When Mw/Mn is too small, the flowability in the melt state assumes an increasing trend and the moldability assumes a declining trend. When, on the other hand, Mw/Mn is too large, the melt viscosity assumes an increasing trend and molding tends to be problematic.

Viewed from the standpoints of the heat stability, hydrolytic stability, and color, the amount of terminal hydroxy group in the polycarbonate resin (A2c) preferably is at least 100 mass-ppm, more preferably at least 200 mass-ppm, still more preferably at least 400 mass-ppm, and most preferably at least 500 mass-ppm. However, it is generally not more than 1,500 mass-ppm and is preferably not more than 1,300 mass-ppm, more preferably not more than 1,200 mass-ppm, and most preferably not more than 1,000 mass-ppm. When the amount of terminal hydroxy group in the polycarbonate resin is too small, this tends to facilitate a decline in the laser transmissivity, and the initial hue at the time of molding may also deteriorate. When the amount of terminal hydroxy group is too large, a trend of a declining residence heat stability and declining wet heat resistance is assumed.

When the thermoplastic polyester resin material (A) contains the combination of polybutylene terephthalate homopolymer (A1) and polycarbonate resin (A2c), the content of the polycarbonate resin (A2c), relative to 100 mass % for the total of (A1) and (A2c), is preferably 5 to 50 mass %, more preferably 10 to 45 mass %, and even more preferably 15 to 45 mass %. A decline in the laser transmissivity and a decline in the laser weld strength are facilitated when the polycarbonate resin content is less than 5 mass %, while the moldability may be reduced at above 50 mass %.

[Other Resins Usable in the Thermoplastic Polyester Resin Material (A)]

The thermoplastic polyester resin material (A) may also contain additional thermoplastic resin other than (A1) and (A2a) to (A2c) in a range wherein the effects of the present invention are not impaired. This additional thermoplastic resin can be specifically exemplified by aromatic vinyl resins, polyacetal resins, polyphenylene oxide resins, polyphenylene sulfide resins, polysulfone resins, polyether sulfone resins, polyetherimide resins, polyetherketone resins, and polyolefin resins.

The aromatic vinyl resin (A2d) is a polymer containing an aromatic vinyl compound as a main component. The aromatic vinyl compound can be exemplified by styrene, α-methylstyrene, para-methylstyrene, vinyltoluene, and vinylxylene, with styrene being preferred. Polystyrene (PS) is a typical example of the aromatic vinyl resin.

A copolymer provided by the copolymerization of monomer other than the aromatic vinyl compound may also be used as the aromatic vinyl resin. Typical examples here are acrylonitrile-styrene copolymers (AS resins) provided by the copolymerization of styrene and acrylonitrile, and maleic anhydride-styrene copolymers (maleic anhydride-modified polystyrene resins) provided by the copolymerization of styrene and maleic anhydride.

An aromatic vinyl resin containing rubber provided by the copolymerization or blending of a rubber component may also be preferably used for the aromatic vinyl resin. The rubber component can be exemplified by hydrocarbons based on a conjugated diene such as butadiene, isoprene, or 1,3-pentadiene, but the use of a butadienic rubber is preferred for the present invention. While an acrylic rubber component may also be used as a rubber component, this is disfavored because it provides a poor toughness.

When a rubber component is copolymerized or blended, the amount of the rubber component, in the total segments of the aromatic vinyl resin, is generally at least 1 mass % and less than 50 mass % and is preferably 3 to 40 mass %, more preferably 5 to 30 mass %, and still more preferably 5 to 20 mass %.

A rubber-containing polystyrene is preferred for the rubber component-containing aromatic vinyl resin, while a butadiene rubber-containing polystyrene is more preferred and, from the standpoint of the toughness, a high-impact polystyrene (HIPS) is particularly preferred.

Polystyrene, acrylonitrile-styrene copolymer (AS resin), butadiene rubber-containing polystyrene, and maleic anhydride-modified polystyrene are preferred for the aromatic vinyl resin (A2d), with polystyrene and high-impact polystyrene (HIPS) being preferred thereamong.

The mass-average molecular weight measured by GPC of the aromatic vinyl resin (A2d) is preferably 50,000 to 500,000, more preferably 100,000 to 400,000 and particularly preferably 150,000 to 300,000. When the molecular weight is smaller than 50,000, bleed out is observed for the molded article and/or decomposition gas is generated during molding and obtaining a satisfactory weld strength is then impeded. At larger than 500,000, it becomes difficult to devise a satisfactory flowability or an improved laser weld strength.

When the aromatic vinyl resin (A2d) is an acrylonitrile-styrene copolymer, the melt flow rate (MFR), measured at 220° C. and 98 N, is preferably 0.1 to 50 g/10 min, more preferably 0.5 to 30 g/10 min, and still more preferably 1 to 20 g/10 min. When the MFR is less than 0.1 g/10 min, the compatibility with the polybutylene terephthalate resin (A1) readily becomes unsatisfactory and the appearance defect of layer separation may be produced during injection molding. An MFR larger than 50 g/10 min can substantially reduce the impact resistance and is thus undesirable.

When the aromatic vinyl resin (A2d) is polystyrene, the MFR, measured at 200° C. and 48 N, is preferably 1 to 50 g/10 min, more preferably 3 to 35 g/10 min, and still more preferably 5 to 20 g/10 min.

When the aromatic vinyl resin (A2d) is a butadiene rubber-containing polystyrene, the MFR, measured at 200° C. and 49 N, is preferably 0.1 to 40 g/10 min, more preferably 0.5 to 30 g/10 min, and still more preferably 0.8 to 20 g/10 min.

When the thermoplastic polyester resin material (A) contains polybutylene terephthalate homopolymer (A1) and polybutylene terephthalate copolymer (A2a) and in addition contains aromatic vinyl resin (A2d), the content of the aromatic vinyl resin (A2d), relative to 100 mass % for the total of these resins, is preferably 10 to 50 mass %, more preferably 15 to 45 mass %, and still more preferably 20 to 40 mass %. When the content of the aromatic vinyl resin is less than 10 mass %, reductions in the laser transmissivity and the laser weld strength readily occur; at above 50 mass %, reductions in the heat resistance and resistance to thermal discoloration readily occur.

When the thermoplastic polyester resin material (A) contains polybutylene terephthalate homopolymer (A1) and polyethylene terephthalate resin (A2b) and in addition contains aromatic vinyl resin (A2d), the content of the aromatic vinyl resin (A2d), relative to 100 mass % for the total of these resins, is preferably 10 to 50 mass %, more preferably 15 to 45 mass %, and still more preferably 20 to 40 mass %. When the content of the aromatic vinyl resin is less than 10 mass %, reductions in the laser transmissivity and the laser weld strength readily occur; at above 50 mass %, reductions in the heat resistance and resistance to thermal discoloration readily occur.

When the thermoplastic polyester resin material (A) contains the polybutylene terephthalate homopolymer (A1) and polycarbonate resin (A2c) and additionally contains the aromatic vinyl resin (A2d), the content proportions are preferably as follows based on 100 mass % for the total of these resins: 30 to 90 mass % for the polybutylene terephthalate homopolymer (A1) and not more than 50 mass % for each of the aromatic vinyl resin (A2d) and polycarbonate resin (A2c).

A more preferred content for the polybutylene terephthalate homopolymer (A1), based on 100 mass % for the total of the polybutylene terephthalate homopolymer (A1), the aromatic vinyl resin (A2d), and the polycarbonate resin (A2c), is 40 to 80 mass %, while 50 to 70 mass % is more preferred. The heat resistance readily declines when the content is less than 30 mass %, while the laser transmissivity readily declines at above 90 mass %.

The content of the aromatic vinyl resin (A2d), relative to 100 mass % for the total of the polybutylene terephthalate homopolymer (A1), the aromatic vinyl resin (A2d), and the polycarbonate resin (A2c), is more preferably 1 to 50 mass %, even more preferably 3 to 45 mass %, and particularly preferably 5 to 40 mass %. The laser weldability and toughness are poor when the content is less than 1 mass %, while the heat resistance readily declines when 50 mass % is exceeded.

The content of the polycarbonate resin (A2c), relative to 100 mass % for the total of the polybutylene terephthalate homopolymer (A1), the aromatic vinyl resin (A2d), and the polycarbonate resin (A2c), is more preferably 1 to 50 mass %, still more preferably 3 to 45 mass %, and particularly preferably 5 to 40 mass %. When the content is less than 1 mass %, the laser transmissivity and laser weldability readily decline, and the dispersion of the aromatic vinyl resin is poor and the surface appearance of the molded article readily declines. When 50 mass % is exceeded, transesterification with the polybutylene terephthalate homopolymer progresses and the residence heat stability readily declines.

The total content of the aromatic vinyl resin (A2d) and polycarbonate resin (A2c), relative to 100 mass % for the total of the polybutylene terephthalate homopolymer (A1), the aromatic vinyl resin (A2d), and the polycarbonate resin (A2c), is preferably 10 to 50 mass %, more preferably 20 to 50 mass %, and still more preferably 25 to 45 mass %. A trend of an excellent balance between the heat resistance and laser transmissivity is provided by the use of such a content, which is thus preferred.

In the above case, the content ratio between the aromatic vinyl resin (A2d) and polycarbonate resin (A2c) is, as the mass ratio, preferably 5:1 to 1:5 and more preferably 4:1 to 1:4. A trend of an excellent balance between the heat resistance and laser transmissivity is provided by the use of such a content ratio, which is thus preferred.

When containing the polybutylene terephthalate homopolymer (A1), aromatic vinyl resin (A2d), and polycarbonate resin (A2c), the crystallization temperature (Tc) of the resulting resin composition is preferably not more than 190° C. That is, by suitably suppressing the transesterification reaction between the polybutylene terephthalate homopolymer and the polycarbonate resin and inducing a suitable reduction in the crystallization temperature, the laser transmissivity can be further improved. The crystallization temperature (Tc) is more preferably not more than 188° C., still more preferably not more than 185° C., particularly preferably not more than 182° C., and most preferably not more than 180° C. Its lower limit is generally 160° C. and is preferably at least 165° C.

The crystallization temperature (Tc) is defined as the peak top temperature of the exothermic peak measured using a differential scanning calorimeter (DSC) in a nitrogen atmosphere by heating from 30° C. to 300° C. at a ramp rate of 20° C./min, holding for 3 minutes at 300° C., and then cooling at a ramp down rate of 20° C./min.

[Additives]

The resin composition for laser welding according to the present invention may as desired also incorporate various additives. These additives can be exemplified by reinforcing fillers, impact modifiers, flow improvers, co-colorants, dispersing agents, stabilizers, plasticizers, ultraviolet absorbers, light stabilizers, oxidation inhibitors, static inhibitors, lubricants, mold release agents, crystallization promoters, nucleating agents, flame retardants, and epoxy compounds.

Reinforcing fillers that can be contained in the resin composition of the present invention are reinforcing fillers that have the effect of improving the mechanical properties of the resin composition obtained by their incorporation in the resin, and common inorganic fillers for use in plastics can be used. The use of a fibrous filler, for example, glass fiber, carbon fiber, basalt fiber, wollastonite, and potassium titanate fiber, is preferred. Also usable are particulate or amorphous fillers of, e.g., calcium carbonate, titanium oxide, feldspar minerals, clay, organoclay, and glass beads; plate-shaped fillers, e.g., talc; and scale-shaped fillers, e.g., glass flake, mica, and graphite. Among the preceding, the use of fibrous fillers and particularly glass fiber is preferred from the standpoint of the laser transmissivity, mechanical strength, stiffness, and heat resistance. Glass fibers having either a circular cross section or a non-axisymmetric cross section may be used.

A reinforcing filler that has been subjected to a surface treatment with a surface treatment agent, e.g., a coupling agent, is more preferably used as the reinforcing filler. Glass fiber bearing a surface treatment agent is preferred due to its excellent durability, wet heat resistance, hydrolysis resistance, and heat shock resistance.

Any heretofore known surface treatment agent can be used as the surface treatment agent, and preferred specific examples are silane coupling agents such as aminosilanes, epoxysilanes, allylsilanes, and vinylsilanes. Among these, aminosilane surface treatment agents are preferred, and preferred specific examples are γ-aminopropyltriethoxysilane, γ-aminopropyltrimethoxysilane, and γ-(2-aminoethyl)aminopropyltrimethoxysilane.

Other preferred surface treatment agents are also novolac-type epoxy resin surface treatment agents and bisphenol A-type epoxy resin surface treatment agents, with treatment with a novolac-type epoxy resin surface treatment agent being preferred.

A single silane surface treatment agent or a plurality thereof may be used; a single epoxy resin surface treatment agent or a plurality thereof may be used; or a silane surface treatment agent may be used in combination with an epoxy resin surface treatment agent.

From the standpoint of the laser weldability and heat shock resistance, the glass fiber is also preferably a glass fiber having a anisotropic cross-sectional shape wherein the ratio between the long diameter and the short diameter in the cross section is 1.5 to 10. With regard to the cross-sectional shape, preferably the cross section is rectangular or oblong and the long diameter/short diameter ratio is in the range of 2.5 to 8 and more preferably in the range of 3 to 6. when $D_2$ is the long diameter, $D_1$ is the short diameter and L is the average fiber length, the aspect ratio $((L \times 2)/(D_2+D_1))$ is preferably at least 10. When a glass fiber having such a flat shape is used, warpage of the molded article is suppressed, and this is effective in particular when a box-shaped welded article is produced.

The content of the reinforcing filler is preferably 5 to 150 mass parts per 100 mass parts of the thermoplastic polyester resin material (A). Obtaining a satisfactory strength and heat resistance is problematic when the content of the reinforcing filler is less than 5 mass parts, while the flowability and laser weldability readily decline at above 150 mass parts. The reinforcing filler content is more preferably 15 to 130 mass parts, still more preferably 20 to 120 mass parts, and particularly preferably 30 to 100 mass parts.

The impact modifier that can be contained in the resin composition of the present invention functions to improve the heat shock resistance of the resin composition. The impact modifier should have an impact resistance-improving effect on the resin, but is not otherwise particularly limited and can be exemplified by known impact modifiers, e.g., polyester elastomers, styrenic elastomers, polyolefinic elastomers, acrylic elastomers, polyamide elastomers, polyurethane elastomers, fluoroelastomers, silicone elastomers, and acrylic core/shell elastomers. Polyester elastomers and styrenic elastomers are preferred.

Polyester elastomers are thermoplastic polyesters that have rubbery characteristics at normal temperature, and preferably are a thermoplastic elastomer in which a polyester block copolymer is the main component, wherein a block copolymer is preferred that has a high-melting•high-crystallinity aromatic polyester as the hard segment and an amorphous polyester or amorphous polyether as the soft segment. The soft segment content in this polyester elastomer is at least 20 to 95 mol % in the total segments and is 50 to 95 mol % in the case of a polybutylene terephthalate and polytetramethylene glycol block copolymer (PBT-PTMG copolymer). The preferred soft segment content is 50 to 90 mol % and particularly 60 to 85 mol %. Among the preceding, polyesterether block copolymers and particularly PTMG-PBT copolymers are preferred because they provide little reduction in the transmittance.

Preferred specific examples of polyester elastomers are as follows: "PRIMALLOY" (Mitsubishi Chemical Corporation, product name, registered trademark (this also applies in the following)), "PELPRENE" (Toyobo Co., Ltd.), "HYTREL" (Du Pont-Toray Co., Ltd.), "VYLON" (Toyobo Co., Ltd.), and "POLYESTER" (The Nippon Synthetic Chemical Industry Co., Ltd.).

Styrenic elastomers are composed of a styrene component and an elastomer component, and styrenic elastomers containing the styrene component in a proportion of generally 5 to 80 mass %, preferably 10 to 50 mass %, and particularly 15 to 30 mass % are preferred. The elastomer component here is, for example, a conjugated diene hydrocarbon of, e.g., butadiene, isoprene, 1,3-pentadiene, and so forth, and is more specifically exemplified by styrene/butadiene copolymer (SBS) elastomers and styrene/isoprene copolymer (SIS) elastomers.

The use is also preferred of the hydrogenated resins (SEBS, SEPS) provided by the hydrogenation of the aforementioned SBS elastomers and SIS elastomers.

The styrenic elastomer can be specifically exemplified by "DYNARON" (JSR Corporation, product name, registered trademark (this also applies in the following)), "TUFTEC" (Asahi Kasei Chemicals Corporation), and "HYBRAR" and "SEPTON" (Kuraray Co., Ltd.).

An epoxy group-containing copolymeric elastomer is also preferred for the impact modifier because it exhibits a good reactivity with thermoplastic polyester resins, e.g., polybutylene terephthalate, and causes little reduction in the laser transmittance.

There are no limitations on the type of epoxy group-containing copolymeric elastomer per se. Preferred examples are those provided by the introduction of the epoxy group into, e.g., the aforementioned styrenic elastomer, polyolefinic elastomer, or acrylic elastomer. For example, in the case of a styrene-butadiene copolymer wherein polystyrene is copolymerized as the hard segment with butadiene as the soft segment, an epoxy group-containing elastomer is obtained by epoxidizing the unsaturated double bond moieties in the diene component.

With an olefinic elastomer, a polyolefin moiety should be present in the soft phase, and an ethylene-propylene rubber, e.g., EPR, EPDM, and so forth, may preferably be used.

There are no particular limitations on the method for introducing the epoxy group, and incorporation into the main chain may be carried out or an epoxy group-containing polymer may be introduced in a block or graft process into an olefinic elastomer. The introduction of an epoxy group-containing (co)polymer in a graft process is preferred.

Epoxy group-containing copolymeric elastomers can be specifically exemplified by "BONDFAST" (Sumitomo Chemical Co., Ltd., product name, registered trademark (this also applies in the following)), "LOTADER" (ARKEMA), "ELVALOY" (Du Pont-Mitsui Polychemicals Co., Ltd.), "PARALOID" (Rohm and Haas), "METABLEN" (Mitsubishi Rayon Co., Ltd.), and "EPOFRIEND" (Daicel Corporation).

A single impact modifier may be used or two or more may be used in combination. The impact modifier content, per 100 mass parts of the thermoplastic polyester resin material (A), is 0 to 20 mass parts, preferably 1 to 18 mass parts, more preferably 2 to 15 mass parts, even more preferably 3 to 12 mass parts, and particularly preferably 3 to 7 mass parts. The heat-resistant stiffness readily declines when the impact modifier content exceeds 20 mass parts.

The epoxy compound that can be contained into the resin composition of the present invention functions to improve the laser weldability and wet heat resistance properties of the resin composition and to further improve the strength and durability of the weld portion of the molded article.

The epoxy compound should contain one or more epoxy groups in each molecule, and generally a glycidyl compound—which is the reaction product of epichlorohydrin with, e.g., an alcohol, a phenol, or a carboxylic acid—or a compound provided by epoxidation of an olefinic double bond may be used.

Preferred specific examples of the epoxy compound are bisphenol-based epoxy compounds such as bisphenol A-based epoxy compounds and bisphenol F-based epoxy compounds, as well as resorcinol-based epoxy compounds, novolac-type epoxy compounds, alicyclic compound-based diepoxy compounds, glycidyl ethers, glycidyl esters, and epoxidized polybutadiene.

The alicyclic compound-based epoxy compounds are exemplified by vinylcyclohexene dioxide and dicyclopentadiene oxide.

The glycidyl ethers can be specifically exemplified by monoglycidyl ethers such as methyl glycidyl ether, butyl glycidyl ether, 2-ethylhexyl glycidyl ether, decyl glycidyl ether, stearyl glycidyl ether, phenyl glycidyl ether, butylphenyl glycidyl ether, and allyl glycidyl ether, as well as by neopentyl glycol diglycidyl ether, ethylene glycol diglycidyl ether, glycerol diglycidyl ether, propylene glycol diglycidyl ether, and bisphenol A diglycidyl ether.

The glycidyl esters can be exemplified by monoglycidyl esters such as glycidyl benzoate esters and glycidyl sorbate esters and by diglycidyl adipate esters, diglycidyl terephthalate esters, and diglycidyl ortho-phthalate esters.

The epoxy compound may also be a copolymer having a glycidyl group-containing compound as one component. Examples are copolymers of the glycidyl ester of an α,β-unsaturated acid with a single monomer or two or more monomers selected from the group consisting of α-olefins, acrylic acid, acrylate esters, methacrylic acid, and methacrylate esters.

The epoxy compound is preferably an epoxy compound having an epoxy equivalent weight of 100 to 500 g/eq and a number-average molecular weight of not more than 2,000. When the epoxy equivalent weight is less than 100 g/eq, due to the excessively large amount of the epoxy group, the resin composition assumes a high viscosity and a decline in the adherence at the weld portion is readily caused. When, conversely, the epoxy equivalent weight exceeds 500 g/eq, due to the small amount of epoxy group, the effect of improving the wet heat resistance characteristics of the resin composition tends to not be satisfactorily expressed. When the number-average molecular weight exceeds 2,000, the compatibility with the thermoplastic polyester resin material (A) declines and a declining trend is assumed for the mechanical strength of the molded article.

Particularly preferred for the epoxy compound are the bisphenol A-based epoxy compounds and novolac-type epoxy compounds obtained by the reaction of epichlorohydrin with bisphenol A or a novolac.

The epoxy compound content, per 100 mass parts of the thermoplastic polyester resin material (A), is 0 to 5 mass parts, while the content of at least 0.1 mass parts is preferred in order to bring about the manifestation of its effects. When the content is greater than 3 mass parts, crosslinking advances and the flowability during molding may then become poor, and because of this the content of 0.2 to 3 mass parts is preferred with 0.2 to 2 mass parts being particularly preferred.

Styrenic oligomers, olefinic oligomers, acrylic oligomers, multifunctional compounds, and branched polymers (including dendrimers (dendritic polymers) and highly branched oligomers, hyperbranched oligomers, and cyclic oligomers) are advantageous examples of impact modifiers that can be contained in the resin composition of the present invention and function to impart flowability and maintain the mechanical strength. The addition of an impact modifier is particularly effective for production of box-shaped welded bodies and welded bodies that have a portion having a flow length of 70 mm or more.

Phosphorus stabilizers, sulfur stabilizers, and phenolic stabilizers are preferred stabilizers that can be contained in the resin composition of the present invention.

Phenolic stabilizers are particularly preferred, and when the resin composition contains a polyethylene terephthalate resin or polycarbonate resin, the use of the combination of a phenolic stabilizer with a phosphorus stabilizer is preferred.

The phosphorus stabilizer can be exemplified by phosphorous acid, phosphoric acid, phosphite esters, and phosphate esters, whereamong organophosphate compounds, organophosphite compounds, and organophosphonite compounds are preferred.

The organophosphate compound is preferable a compound given by the following general formula:

$$(R^1O)_{3-n}P(=O)OH_n \qquad (1)$$

(in formula (1), $R^1$ is an alkyl group or aryl group, and each may be the same or may differ, and n is an integer from 0 to 2). Long-chain alkyl acid phosphate compounds wherein $R^1$ has 8 to 30 carbons are more preferred. Specific examples of alkyl groups having 8 to 30 carbons are the octyl group, 2-ethylhexyl group, isooctyl group, nonyl group, isononyl group, decyl group, isodecyl group, dodecyl group, tridecyl group, isotridecyl group, tetradecyl group, hexadecyl group, octadecyl group, eicosyl group, and triacontyl group.

The long-chain alkyl acid phosphates can be exemplified by octyl acid phosphate, 2-ethylhexyl acid phosphate, decyl acid phosphate, lauryl acid phosphate, octadecyl acid phosphate, oleyl acid phosphate, behenyl acid phosphate, phenyl acid phosphate, nonylphenyl acid phosphate, cyclohexyl acid phosphate, phenoxyethyl acid phosphate, alkoxypolyethylene glycol acid phosphate, bisphenol A acid phosphate, dimethyl acid phosphate, diethyl acid phosphate, dipropyl acid phosphate, diisopropyl acid phosphate, dibutyl acid phosphate, dioctyl acid phosphate, di-2-ethylhexyl acid phosphate, dilauryl acid phosphate, distearyl acid phosphate, diphenyl acid phosphate, and bisnonylphenyl acid phosphate. Octadecyl acid phosphate is preferred among the preceding.

The organophosphite compound is preferable a compound given by the following general formula

$$R^2O-P(OR^3)(OR^4) \qquad (2)$$

(in formula (2), $R^2$, $R^3$, and $R^4$ are each a hydrogen atom, an alkyl group having 1 to 30 carbons, or an aryl group having 6 to 30 carbons, and at least one of $R^2$, $R^3$, and $R^4$ is an aryl group having 6 to 30 carbons).

The organophosphite compound can be exemplified by triphenyl phosphite, tris(nonylphenyl) phosphite, dilauryl hydrogen phosphite, triethyl phosphite, tridecyl phosphite, tris(2-ethylhexyl) phosphite, tris(tridecyl) phosphite, tristearyl phosphite, diphenyl monodecyl phosphite, monophenyl didecyl phosphite, diphenyl mono(tridecyl) phosphite, tetraphenyl dipropylene glycol diphosphite, tetraphenyl tetra(tridecyl) pentaerythritol tetraphosphite, hydrogenated bisphenol A phenol phosphite polymer, diphenyl hydrogen phosphite, 4,4'-butylidene-bis(3-methyl-6-tert-butylphenyl di(tridecyl) phosphite), tetra(tridecyl) 4,4'-isopropylidenediphenyl diphosphite, bis(tridecyl) pentaerythritol diphosphite, bis(nonylphenyl) pentaerythritol diphosphite, dilauryl pentaerythritol diphosphite, distearyl pentaerythritol diphosphite, tris(4-tert-butylphenyl) phosphite, tris(2,4-di-tert-butylphenyl) phosphite, hydrogenated bisphenol A pentaerythritol phosphite polymer, bis(2,4-di-tert-butylphenyl) pentaerythritol diphosphite, bis(2,6-di-tert-butyl-4-methylphenyl) pentaerythritol diphosphite, 2,2'-methylenebis(4,6-di-tert-butylphenyl) octyl phosphite, and bis(2,4-dicumylphenyl) pentaerythritol diphosphite. Bis (2,6-di-tert-butyl-4-methylphenyl) pentaerythritol diphosphite is preferred among the preceding.

The organophosphonite compound is preferable a compound given by the following general formula

$$R^5\text{—}P(OR^6)(OR^7) \qquad (3)$$

(in formula (3), $R^5$, $R^6$, and $R^7$ are each a hydrogen atom, an alkyl group having 1 to 30 carbons, or an aryl group having 6 to 30 carbons, and at least one of $R^5$, $R^6$, and $R^7$ is an aryl group having 6 to 30 carbons).

The organophosphonite compound can be exemplified by tetrakis(2,4-di-iso-propylphenyl)-4,4'-biphenylenediphosphonite, tetrakis(2,4-di-n-butylphenyl)-4,4'-biphenylenediphosphonite, tetrakis(2,4-di-tert-butylphenyl)-4,4'-biphenylenediphosphonite, tetrakis(2,4-di-tert-butylphenyl)-4,3'-biphenylenediphosphonite, tetrakis(2,4-di-tert-butylphenyl)-3,3'-biphenylenediphosphonite, tetrakis(2,6-di-iso-propylphenyl)-4,4'-biphenylenediphosphonite, tetrakis(2,6-di-n-butylphenyl)-4,4'-biphenylenediphosphonite, tetrakis(2,6-di-tert-butylphenyl)-4,4'-biphenylenediphosphonite, tetrakis(2,6-di-tert-butylphenyl)-4,3'-biphenylenediphosphonite, and tetrakis(2,6-di-tert-butylphenyl)-3,3'-biphenylenediphosphonite.

Any heretofore known sulfur atom-containing compound can be used as the sulfur stabilizer, whereamong thioethers are preferred. Specific examples are didodecyl thiodipropionate, ditetradecyl thiodipropionate, dioctadecyl thiodipropionate, pentaerythritol tetrakis(3-dodecylthiopropionate), thiobis(N-phenyl-(β-naphthylamine), 2-mercaptobenzothiazole, 2-mercaptobenzoimidazole, tetramethylthiuram monosulfide, tetramethylthiuram disulfide, nickel dibutyldithiocarbamate, nickel isopropylxanthate, and trilauryl trithiophosphite. Pentaerythritol tetrakis(3-dodecylthiopropionate) is preferred among the preceding.

The phenolic stabilizer can be exemplified by pentaerythritol tetrakis(3-(3,5-di-t-butyl-4-hydroxyphenyl)propionate), octadecyl-3-(3,5-di-tert-butyl-4-hydroxyphenyl)propionate, thiodiethylenebis(3-(3,5-di-tert-butyl-4-hydroxyphenyl)propionate), and pentaerythritol tetrakis(3-(3,5-di-neopentyl-4-hydroxyphenyl)propionate). Pentaerythritol tetrakis(3-(3,5-di-tert-butyl-4-hydroxyphenyl)propionate) and octadecyl-3-(3,5-di-tert-butyl-4-hydroxyphenyl)propionate are preferred among the preceding.

A single stabilizer may be contained or any combination of two or more in any proportions may be contained.

The stabilizer content, per 100 mass parts of the thermoplastic polyester resin material (A), is preferably 0.001 to 2 mass parts. When the stabilizer content is less than 0.001 mass parts, little improvement in the compatibility and heat stability of the resin composition can be expected and the occurrence during molding of a deterioration in the hue and a reduction in the molecular weight is facilitated. When 2 mass parts is exceeded, the amount becomes excessive and a trend is assumed wherein the occurrence of silver streaks and a deterioration in the hue is further facilitated. The stabilizer content is more preferably 0.001 to 1.8 mass parts and is still more preferably 0.1 to 1.5 mass parts.

Already known mold release agents commonly used in polyester resins can be used as the mold release agent that can be contained in the resin composition of the present invention, whereamong at least one mold release agent selected from polyolefinic compounds, fatty acid ester compounds, and silicone compounds is preferred.

The polyolefinic compounds can be exemplified by compounds selected from paraffin waxes and polyethylene waxes, whereamong those having a mass-average molecular weight, as measured by GPC, preferably of 700 to 10,000 and more preferably of 900 to 8,000 are preferred. Also particularly preferred are polyolefinic compounds modified by the introduction of, e.g., the hydroxyl group, carboxyl group, acid anhydride group, epoxy group, and so forth, in side chain position.

The fatty acid ester compound is exemplified by fatty acid esters, e.g., glycerol fatty acid esters, sorbitan fatty acid esters, and pentaerythritol fatty acid esters, and by their partial saponification products, whereamong fatty acid esters constituted of fatty acids having 11 to 28 carbons and preferably 17 to 21 carbons are preferred. Specific examples are glycerol monostearate, glycerol monobehenate, glycerol dibehenate, glycerol-12-hydroxymonostearate, sorbitan monobehenate, pentaerythritol distearate, and pentaerythritol tetrastearate.

The silicone compound is preferably a modified compound from the standpoint of the compatibility with the polyester resin. Modified silicone oils can be exemplified by silicone oils provided by the introduction of an organic group in side chain position on a polysiloxane and by silicone oils provided by the introduction of an organic group at both terminals and/or at one terminal of a polysiloxane. The introduced organic group can be exemplified by the epoxy group, amino group, carboxyl group, carbinol group, methacrylic group, mercapto group, and phenol group, and the epoxy group is preferred. A particularly preferred modified silicone oil is silicone oil provided by the introduction of the epoxy group in side chain position on a polysiloxane.

The content of the mold release agent is preferably 0.05 to 2 mass parts per 100 mass parts of the thermoplastic polyester resin material (A). At below 0.05 mass parts, a trend exists of declining surface properties due to poor mold release during melt molding. On the other hand, at above 2 mass parts, the processability in kneading the resin composition declines, and cloudiness may be observed at the surface of the molded article. The release agent content is preferably 0.07 to 1.5 mass parts and is more preferably 0.1 to 1.0 mass parts.

The usual methods for producing resin compositions can be carried out for the method for producing the resin composition of the present invention. In general, the respective components and the various additives added as desired are combined and thoroughly mixed followed by melt-kneading using a single-screw or twin-screw extruder. The resin composition of the present invention may also be produced by feeding the respective components by use of a feeder to an extruder carrying out melt-kneading by feeding the individual components without pre-mixing or with pre-mixing only partly the components, and melt-kneading. A master-batch may be prepared by melt-kneading a blend of a portion of the additional resin with a portion of the resins that constitute the thermoplastic polyester resin material (A), followed by blending thereinto the remaining polyester resin and other components and melt-kneading.

When a fibrous reinforcing filler such as glass fiber is used, feeding from a side feeder along the course of the extruder cylinder is also preferred.

The heating temperature during melt-kneading can be selected as appropriate generally from the range of 220° C. to 300° C. When the temperature is too high, this facilitates the generation of decomposition gases and can cause a loss of transparency. The screw construction is therefore desirably selected considering, e.g., the shear-generated heat. An oxidation inhibitor and/or heat stabilizer is desirably used in order to inhibit decomposition during kneading and during molding in an ensuing step.

[Molded Article for Laser Welding]

There are no particular limitations on the method for producing the molded article, and the molding methods generally used with polyester resin compositions may be adopted without limitation. Examples here are injection molding methods, ultrahigh speed injection molding methods, injection compression molding methods, two-color molding methods, hollow molding methods such as gas-assisted molding, molding methods using insulated molds, molding methods using rapidly heated molds, foam molding (also including supercritical fluids), insert molding, IMC (in-mold coating molding) molding, extrusion molding, sheet molding, thermoforming m, rotational molding, laminate molding, press molding, and blow molding, whereamong injection molding is preferred.

The converted absorbance a of the molded article prior to laser welding is preferably 0.05 to 1.0 for the resin composition for laser welding of the present invention, with 0.08 to 0.9 being more preferred. The spreading of the resin melt in laser welding (the size of the melt pool) can be adjusted by adjusting this value. Due to this, a high weld strength sufficient for practical use is obtained even for butt-welding. In addition, due to the excellent gap weldability, the breadth of the laser welding processability is also widened in lap-welding and butt-welding.

The converted absorbance a can be adjusted through the alloy type or elastomer for the base resin, the blending of additives such as reinforcing materials, and the amount of nigrosine. It can also be adjusted through adjustment, in the production of the molded article, of the extent of the surface properties of the mold and the distance from the gate and through adjustment of the molding conditions, i.e., the injection rate, the surface advance coefficient, and the mold temperature.

The converted absorbance a is determined with the formula indicated below using the values obtained by determining the transmittance T (%) and reflectance R (%) at a wavelength of 940 nm using a UV-visible-near infrared spectrophotometer ("UV-3100PC", Shimadzu Corporation). When the measurement uses a molded plate that does not have a thickness of 1 mm, the converted absorbance converted to a thickness of 1 mm is determined as a/t using the thickness t (mm) of the measurement location.

Absorbance $a=-\log \{T/(100-R)\}$

The incidence ratio K of the molded article prior to laser welding preferably is in the range of 20% to 80% for the resin composition for laser welding of the present invention, while 25% to 75% is more preferred and the range of 30% to 70% is particularly preferred.

When the incidence ratio is less than 20%, the butt-welding capability declines and the gap welding capability also declines. Conversely, when the incidence ratio exceeds 80%, the lap-welding capability declines and the gap welding capability also declines.

The amount of laser transmission and the amount of laser absorption are modulated by bringing the incidence ratio K into the indicated range, and as a consequence of the use, as in conventional laser welding, two types of molded articles, i.e., a molded article from a laser-transmissive resin and a molded article from a laser-absorptive resin, are unnecessary and it becomes possible to provide a laser-weldable polyester molded article that enables laser welding with only a single type of resin material. In particular, the effects of the present invention are substantial when molded articles composed of the same type of resin material are welded to each other.

The use of a resin composition having a crystallization temperature (Tc) of not more than 190° C. is a preferred method for adjusting the incidence ratio. That is, the incidence ratio can be adjusted into the preferred range by controlling to a lower crystallization temperature (Tc).

The incidence ratio also varies substantially in accordance with the laser transmittance. The molding conditions are a factor that causes the transmittance to change, and these molding conditions can be exemplified by the injection rate, mold temperature, resin temperature, holding pressure, and so forth. Among these, change is readily brought about using the injection rate and the mold temperature. With regard to mold structure, change is also readily effected using the surface properties of the mold, the gate shape, the gate position, and the number of gates. With regard to the molded article, large changes are also brought about by the position at which the transmittance is measured and the distance from the gate position when molding is carried out. Accordingly, the incidence ratio can be adjusted into the preferred range through a determination of these conditions as appropriate.

The crystallization temperature (Tc) preferably is not more than 188° C., more preferably not more than 185° C., and still more preferably not more than 182° C., whereamong not more than 180° C. is preferred. The lower limit is generally 160° C. and is preferably at least 165° C. The crystallization temperature (Tc) is measured by DSC. The details are described in the examples.

Prior to laser welding, the molded article provided by molding using the resin composition of the present invention exhibits an excellent black color. This is expressed in the present invention by the color difference ΔE00 from a standard plate that exhibits a standard black color.

The color difference ΔE00 is determined using the CIE2000 color difference formula. Compared to ΔE, which is a general evaluation method, ΔE00 is an evaluation method that is closer to the perception of the human eye, and, since its numerical value is smaller as the blackness of the standard plate is approached, it is suitable for evaluating the difference in blackness. The value here is preferably 6.0 or less.

The resin composition for laser welding according to the present invention is molded by an injection molding method into a member for laser welding having a desired shape. For example, a high-speed injection molding method or an injection compression molding method can be used for the injection molding method.

There are no particular limitations on the injection molding conditions, but the injection velocity is preferably 10 to 500 mm/sec, more preferably 30 to 400 mm/sec, even more preferably 50 to 300 mm/sec, and particularly preferably 80 to 200 mm/sec.

A faster injection velocity provides a higher transmittance, which has an effect on the incidence ratio. However, when the injection velocity is too fast, gas scorching is produced at the flow termination locations of the molded article, and due to this countermeasures are preferably taken, e.g., reduction to a favorable injection velocity or increasing the size of the gas vent in the mold structure.

The resin temperature is preferably 250° C. to 280° C. and more preferably 255° C. to 275° C. The mold temperature is preferably 40° C. to 130° C. and more preferably 50° C. to 100° C.

A lower mold temperature provides a higher transmittance and thus also has an effect on the incidence ratio. When the mold temperature is too low, the crystallinity of the molded article is then low and as a consequence the post-shrinkage becomes large and the dimensional stability also deteriorates. As a consequence, the mold temperature is also preferably adjusted so as to provide a favorable transmittance and incidence ratio.

The injection rate, which is defined as the volume of resin material injected per unit time into the mold cavity from the injection nozzle on the injection molding machine, is preferably 10 to 300 cm$^3$/sec, more preferably 15 to 200 cm$^3$/sec, still more preferably 25 to 100 cm$^3$/sec, and particularly preferably 50 to 90 cm$^3$/sec. By having the injection rate be in the indicated range, the incidence ratio of the weld part of, e.g., the region at the position on opposite side to the gate of the injection-molded member, can be adjusted into the preferred range, and, by adjustment of the gate position, the incidence ratio of the weld position in the member can be adjusted into a suitable range. In injection molding, the volume of resin material injected in one injection is controlled by adjusting the time required for injection and the injected volume of the resin material per unit time, and the material volume of the resin material per unit time is the injection rate (unit: cm$^3$/sec).

In addition, injection molding is preferably performed under the condition of a surface progression factor, defined below, of 100 to 1,200 cm$^3$/sec·cm. By having the surface progression factor be in the indicated range, the incidence ratio of, for example, the region on the opposite side to the gate of the member, can be adjusted into the preferred range and it becomes possible, through adjustment of the gate position, to adjust the incidence ratio of the weld location in the member into a more advantageous range.

Surface progression factor: value provided by dividing the injection rate by the average thickness of the mold cavity into which the resin material is injected The preferred range for the surface progression factor is 200 to 1,100 cm$^3$/sec·cm, while 250 to 1,000 cm$^3$/sec·cm is more preferred, 300 to 950 cm$^3$/sec·cm is still more preferred, and 330 to 930 cm$^3$/sec·cm is particularly preferred.

The molded article for laser welding may have any shape and may be a profile extrusion (e.g., rod and pipe) as is supplied to butt-welding of the ends; also preferred are metal-inserted molded articles used for, e.g., conductive components and electronic components, where a high waterproofness and airtightness are required.

[Laser-Welded Body]

When a molded article from the resin composition for laser welding of the present invention is used, it then becomes unnecessary to use two types of molded articles, i.e., a molded article from a laser-transmissive resin and a molded article from a laser-absorptive resin, as has heretofore been required. In addition, because the laser-transmission depth is large and as a consequence a large melt depth can be secured, a satisfactorily high weld strength can be achieved certainly for lap-welding, but also for the end-to-end butt-welding of laser-weldable molded articles, which has not been possible to date. Moreover, even when a gap has been temporarily produced at the joint region of the molded article due to warpage or sink marks during molding, laser welding is still possible when the gap is at least 0.1 mm, preferably at least 0.2 mm, more preferably at least 0.5 mm, and particularly preferably at least 0.8 mm.

The type of irradiated laser may be freely selected from near infrared laser, and, for example, a YAG (yttrium•aluminum•garnet crystal) laser (wavelength=1,064 nm) and LD (laser diode) laser (wavelength=808 nm, 820 nm, 840 nm, 880 nm, 940 nm) can preferably be used.

The shape, size, thickness, and so forth of the laser-welded welded body is not limited, and the welded body is advantageously applied to components for transportation equipment such as automobiles, components for electrical and electronic devices and equipment, components for industrial machinery, other consumer product components, and so forth.

Preferred laser welding methods are, for example, butt-welding and lap-welding.

In the case of butt-welding, a laser-welded body can be made, as shown in FIG. 2, by abutting two molded articles 1 and 2 and producing a weld 5 by exposure to laser beam 4 while scanning.

In the case of lap-welding, a laser-welded body can be made, as shown in FIG. 3, by overlapping two molded articles 1 and 2 and producing a weld 5 by exposure to laser beam 4 while scanning.

The laser-welded body obtained by the butt or lap laser welding of molded articles obtained with the colored resin composition of the present invention exhibits a substantially improved weld strength and satisfies the practical strength required of laser-welded bodies. In addition, when the laser welding conditions are considered, the permissible range for the amount of energy from the laser is found to have an exceptional broad range, and such a molded article capable of accommodating broad laser welding conditions can support a highly practical laser welding, for example, the welding of molded articles having complex structures and the welding of molded articles having variable thicknesses. This is, moreover, a laser-welded body that has the ability to resist thermal discoloration and colorant bleed and that has little influence on electronic components.

EXAMPLES

The present invention is described more specifically using the following Examples, but the present invention is certainly not limited to only these Examples.

Production Examples 1 to 9 and Comparative Production Examples 1 to 3, the latter being outside the application of the present invention, are given below for the colorants, while their compositional proportions are given in Table 1.

Production Example 1: Production of Colorant Example 1

0.66 mass parts of anthraquinone dye 1 (maximum absorption wavelength=628 nm, C. I. Solvent Blue 104), 0.58 mass parts of perinone dye 1 (maximum absorption wavelength=472 nm, C. I. Solvent Red 179), and 0.56 mass parts of anthraquinone dye 3 (maximum absorption wavelength=446 nm, C. I. Solvent Yellow 163) were introduced into a blender and were stirred for 5 hours to obtain 1.8 mass parts of Colorant Example 1.

The absorbance and maximum absorption wavelength of the dyes used in the preceding were measured using the following method, and the absorption curves are given in FIG. 1.

[Method for Measuring the Absorbance and Maximum Absorption Wavelength]

0.05 g of the dye sample was weighed out and was dissolved in dimethylformamide (DMF) and adjustment using a 100-ml volumetric flask was carried out. 2 ml of this adjusted solution was taken up with a whole pipette and was brought to volume with DMF in a 50-ml volumetric flask to prepare an adjusted solution.

The absorption spectrum was measured on the obtained adjusted solution using a UV-visible spectrophotometer (product name: UV-1100, Shimadzu Corporation).

Production Example 2: Production of Colorant Example 2

1.8 mass parts of Colorant Example 2 was obtained in Production Example 2 by proceeding as in Production Example 1, but changing the blend composition of Production Example 1 to 0.54 mass parts of anthraquinone dye 2 (maximum absorption wavelength=629 nm, C. I. Solvent Blue 97), 0.63 mass parts of perinone dye 1 (maximum absorption wavelength=472 nm, C. I. Solvent Red 179), and 0.63 mass parts of anthraquinone dye 3 (maximum absorption wavelength=446 nm, C. I. Solvent Yellow 163).

Production Examples 3 to 9: Production of Colorant Examples 3 to 9

In Production Examples 3 to 9, Colorant Example 3 to Colorant Example 9 were obtained proceeding as in Production Example 1, but changing the blend composition of Production Example 1 to the compositions given in Table 1.

Comparative Production Example 1: Production of Comparative Colorant Example 1

1.50 mass parts of anthraquinone dye 1 (maximum absorption wavelength=628 nm, C. I. Solvent Blue 104), 0.90 mass parts of perinone dye 1 (maximum absorption wavelength=472 nm, C. I. Solvent Red 179), and 0.60 mass parts of anthraquinone dye 3 (maximum absorption wavelength=446 nm, C. I. Solvent Yellow 163) were introduced into a blender and were stirred for 5 hours to obtain 3.0 mass parts of Comparative Colorant Example 1.

Comparative Production Examples 2 and 3: Production of Comparative Colorant Examples 2 and 3

In Comparative Production Examples 2 and 3, Comparative Colorant Example 2 and Comparative Colorant Example 3 were obtained proceeding as in Comparative Production Example 1, but changing the blend composition to the dyes and compositions given in Table 1.

TABLE 1

| | | | $\lambda$ max | Colorant Example 1 | Colorant Example 2 | Colorant Example 3 | Colorant Example 4 | Colorant Example 5 | Colorant Example 6 |
|---|---|---|---|---|---|---|---|---|---|
| Compositional ratio (mass parts) | C1 anthraquinone dye 1 | Solvent Blue 104 | 628 nm | 0.66 | | | 0.72 | 0.72 | 0.63 |
| | C1 anthraquinone dye 2 | Solvent Blue 97 | 629 nm | | 0.54 | 0.63 | | | |
| | C2 perinone dye 1 | Solvent Red 179 | 472 nm | 0.58 | 0.63 | 0.54 | 0.45 | 0.63 | 0.45 |
| | C3 anthraquinone dye 3 | Solvent Yellow 163 | 446 nm | 0.56 | 0.63 | 0.63 | 0.63 | 0.45 | 0.72 |
| | Triphenylmethane dye 1 | Solvent Blue 23 | 530 nm | | | | | | |
| | Azomethine dye | Solvent Brown 53 | 436 nm | | | | | | |
| Anthraquinone dye C1:perinone dye C2:anthraquinone dye C3 mass ratio | | | | 37:32:31 | 30:35:35 | 35:30:35 | 40:25:35 | 40:35:25 | 35:25:40 |
| C2/C1 ratio | | | | 0.88 | 1.17 | 0.86 | 0.63 | 0.88 | 0.71 |

| | | | $\lambda$ max | Colorant Example 7 | Colorant Example 8 | Colorant Example 9 | Comp. Colorant Example 1 | Comp. Colorant Example 2 | Comp. Colorant Example 3 |
|---|---|---|---|---|---|---|---|---|---|
| Compositional ratio (mass parts) | C1 anthraquinone dye 1 | Solvent Blue 104 | 628 nm | 0.54 | 0.45 | 0.45 | 1.50 | 0.49 | |
| | C1 anthraquinone dye 2 | Solvent Blue 97 | 629 nm | | | | | | |

TABLE 1-continued

|  |  |  |  |  |  |  |  |  |  |
|---|---|---|---|---|---|---|---|---|---|
|  | C2 perinone dye 1 | Solvent Red 179 | 472 nm | 0.45 | 0.54 | 0.63 | 0.90 | 0.84 |  |
|  | C3 anthraquinone dye 3 | Solvent Yellow 163 | 446 nm | 0.81 | 0.81 | 0.72 | 0.60 | 0.47 |  |
|  | Triphenylmethane dye 1 | Solvent Blue 23 | 530 nm |  |  |  |  |  | 0.40 |
|  | Azomethine dye | Solvent Brown 53 | 436 nm |  |  |  |  |  | 0.80 |
| Anthraquinone dye C1:perinone dye C2:anthraquinone dye C3 mass ratio |  |  |  | 30:25:45 | 25:30:45 | 25:35:40 | 50:30:20 | 27:47:26 | — |
| C2/C1 ratio |  |  |  | 0.83 | 1.20 | 1.40 | 0.60 | 1.71 | — |

(Production of Molded Articles and Laser Welding Using the Molded Articles)

Using the colorant examples produced as described above, molded articles were produced from resin compositions using the method described below. Laser welding was then carried out using these molded articles.

Except for the colorants, the starting materials used are the components described in the following Table 2.

Example A1

Production of Molded Article Example 1

The following were introduced into a stainless steel tumbler and were stirred and mixed for 1 hour: 50 mass parts of polybutylene terephthalate homopolymer (A1) (NOVADURAN 5008), 50 mass parts of polybutylene terephthalate copolymer (A2a) (NOVADURAN 5605), 0.4 mass parts of

TABLE 2

| Component | Symbol | Component description |
|---|---|---|
| PBT homopolymer (A1) | PBThomo | Polybutylene terephthalate resin<br>From Mitsubishi Engineering-Plastics Corporation<br>Product name: NOVADURAN (registered trademark) 5008<br>Intrinsic viscosity: 0.85 dl/g<br>Amount of terminal carboxyl group: 13 eq/ton |
| PBT copolymer (A2a) | PBTco | Polybutylene terephthalate resin copolymerized 10 mol % of isophthalic acid<br>From Mitsubishi Engineering-Plastics Corporation<br>Product name: NOVADURAN (registered trademark) 5605<br>Intrinsic viscosity: 0.84 dl/g<br>Amount of terminal carboxyl group: 20 eq/ton |
| Polyethylene terephthalate resin (A2b) | PET | From Mitsubishi Chemical Corporation<br>Product name: NOVAPET (registered trademark) PBK1<br>Intrinsic viscosity: 0.64 dl/g<br>Amount of terminal carboxyl group: 36 eq/ton |
| Polycarbonate resin (A2c) | PC | From Mitsubishi Engineering-Plastics Corporation<br>Product name: IUPILON (registered trademark) H4000<br>Viscosity-average molecular weight: 16,000 |
| Aromatic vinyl resin (A2d) | HIPS | Rubber-modified polystyrene resin (HIPS)<br>From PS Japan Corporation, product name: HT478<br>MFR: 3 g/10 min (200° C., 49N)<br>Butadiene rubber content: 7.4 mass %<br>Mass-average molecular weight: approximately 200,000 |
|  | mPS | Maleic anhydride-modified polystyrene resin<br>From Polyscope Polymers BV<br>Product name: XIRAN 08250<br>Mass-average molecular weight: 250,000<br>Maleic anhydride unit content: 8 mass % |
|  | AS | Acrylonitrile-styrene copolymer<br>From Denka Company Limited, product name: GR-AT-R<br>MFR: 11 g/10 min (220° C., 98N)<br>Acrylonitrile content: 31 mass % |
| Glass fiber | GF | From Nippon Electric Glass Co, product name: T-187<br>Average fiber diameter: 13 mm, average fiber length: 3 mm |
| Phosphorus stabilizer | Stab 1 | Mixture of $O=P(OH)_n(OC_{13}H_{37})_{3-n}$ in which n = 1, 2<br>From Adeka Corporation, product name: ADK STAB AX-71 |
| Phenolic stabilizer | Stab 2 | Pentaerythritol tetrakis[3-(3,5-di-tert-butyl-4-hydroxyphenyl)propionate]<br>From Adeka Corporation, product name: ADK STAB AO-60 |
| Mold release agent | MR | Pentaerythritol tetrastearate<br>NOF Corporation, product name: UNISTER H476 | the phenolic stabilizer (stabilizer 2, ADK STAB AO-60), 0.7 mass parts of the mold release agent (UNISTER H476), 0.014 mass parts of nigrosine (NUBIAN BLACK TH-807), and 0.386 mass parts of Colorant Example 1. The resulting mixture was introduced into the main hopper of a 30-mm vented twin-screw extruder ("TEX30α", The Japan Steel Works, Ltd.); 43 mass parts of glass fiber (GF) (T-187) was supplied from the 7th side feeder from the hopper; extrusion into strand form was carried out with kneading under the conditions of 260° C. for the extruder barrel set temperatures C1 to C15, 250° C. for the die, a screw rotation rate of 200 rpm, and an ejection rate of 40 kg/hour; and pellets of the resin composition were produced. Using an injection molding machine (Si-50, Toyo Machinery & Metal Co., Ltd.), the obtained pellets were molded at a cylinder temperature of 260° C. and a mold temperature of 80° C. to produce two of a black Molded Article Example 1 (Molded Article Example 1-1, Molded Article Example 1-2) having length 80 mm×width 20 mm×thickness 2 mm.

To provide a measurement test specimen for the converted absorbance a and the incidence ratio, a step-shaped black molded plate 1K having length 80 mm×width 50 mm×thickness 1.5 mm and 1 mm for its two steps was produced by molding under conditions of a cylinder temperature of 260° C., a mold temperature of 80° C., an injection velocity of 120 mm/sec, an injection rate of 51 cm$^3$/sec, and a surface progression factor of 405 cm$^3$/sec·cm.

In the Example A1-A3, the two molded articles (Molded Article Example 1-1 and Molded Article Example 1-2 in this Example) were used to measure the laser weld strength, and the step-shaped molded plate (molded plate 1K in this Example) was used to measure the transmittance, reflectance, converted absorbance, and color difference.

[Measurement of the Transmittance, Reflectance, and Converted Absorbance]

Using an ultraviolet-visible-near infrared spectrophotometer ("UV-3100PC", Shimadzu Corporation), the transmittance T (%) and reflectance R (%) at a wavelength of 940 nm were determined at the 1 mm-thick position, which was on the opposite side to the gate of the two-step stepped molded plate.

The absorbance a was determined using the formula:

$$a=-\log\{T/(100-R)\}.$$

[Determination of the Incidence Ratio]

The incidence ratio K (unit: %) was determined using the following formula.

Incidence ratio $K$ (%)=100−transmittance−reflectance

The incidence ratio K is the incidence ratio for laser at a wavelength of 940 nm for a molded article with a thickness of 1 mm. For the two-step plate (length 80 mm×width 50 mm×thickness of 1.5 mm and 1 mm, the gate region is the 1.5 mm-thick side), it was derived from the measurement results for the transmittance and reflectance at the 1 mm-thick position, which was on opposite side to the gate.

Measurement of the Color Difference—Comparative Test Between a Standard Molded Plate and Molded Article Example 1

(Production of the Standard Molded Plate for Measurement of the Color Difference)

The standard molded plate was produced using the following method.

One standard molded plate for measurement of the color difference, designated STD·BK and having a two-step shape of length 80 mm×width 50 mm×thickness 1.5 mm and 1 mm, was produced by molding a black polybutylene terephthalate resin (product name: NOVADURAN 5010G30 BK2, Mitsubishi Engineering-Plastics Corporation) using an Si-50 injection molding machine and a cylinder temperature of 260° C. and a mold temperature of 80° C. This standard molded plate had L*=16.05, a*=−0.24, and b*=−1.70.

Using a spectrocolorimeter (Suga Test Instruments Co., Ltd., product name: SC-T), the molded plate 1K and standard molded plate obtained as described above were subjected to color measurement using measurement illuminant=D65/10°, color measurement diameter=30 mmØ, measurement location=back side of 1 mm-thick region, and the color difference between the standard molded plate and the molded plate 1K was determined and the ΔE00 of the molded plate 1K was determined using the standard molded plate as the standard. These results are given in Table 3 below.

Production of a Laser Butt-Welded Body

The two Molded Article Examples 1 (Molded Article Example 1-1, Molded Article Example 1-2) were as such brought into abutting contact as shown in FIG. 3, and a integrated laser-welded body was obtained when exposure was carried out by scanning 15 mm along the interface between the abutted molded articles 1 and 2 using a laser beam 4 provided by a diode laser having an output of 50 W [wavelength: 940 nm, continuous] and using the scanning speed (mm/sec) given in Table 3 for the scanning speed.

The welding conditions are as follows.

Laser welding device: FD-200 (50 W device) from Fine Device Co., Ltd.
Output: 50 W (setting)
Spot diameter: 1 mmØ
Scanning speed: the scanning speed is given in Table 3
Irradiated energy: as indicated in Table 3
Scan distance: 15 mm The weld strength was measured on the resulting laser-welded body by carrying out a tensile test in accordance with JIS K 7161-1994 using a tensile tester (AG-50kNE, Shimadzu Corporation) and a test speed of 10 mm/min in the longitudinal direction of the welded body (direction causing separation of the weld). The results are given in Table 3.

Comparative Examples A1 and A2

Comparative Molded Article Examples 1 and 2 according to Comparative Examples A1 and A2 and the respective step-shaped molded plates were obtained proceeding as in Example A1, but changing the blend composition as indicated in Table 3. Table 3 gives the ΔE00 for the color difference and the converted absorbance a and incidence ratio K derived from the transmittance and reflectance proceeding as in Example A1.

Using the obtained molded plates, laser butt-welding was performed as in Example A1 to obtain laser-welded bodies. The weld strength was measured by carrying out the tensile test, and the results are given in Table 3.

Example A2

Production of Molded Article Example 2

The following were introduced into a stainless steel tumbler and were stirred and mixed for 1 hour: 60 mass parts of polybutylene terephthalate homopolymer (A1), 40 mass parts of polyethylene terephthalate resin (A2b) (NOVAPET PBK1), 0.4 mass parts of the phenolic stabilizer (stabilizer 2), 0.7 mass parts of the mold release agent, 0.014 mass parts of nigrosine (NUBIAN BLACK TH-807), and 0.386 mass parts of Colorant Example 1. The resulting mixture was introduced into the main hopper of a 30-mm vented twin-screw extruder ("TEX30α", The Japan Steel Works, Ltd.); 43 mass parts of glass fiber (GF) was supplied from the 7th side feeder from the hopper; extrusion into strand form was carried out with kneading under the conditions of 260° C. for the extruder barrel set temperatures C1 to C15, 250° C. for the die, a screw rotation rate of 200 rpm, and an ejection rate of 40 kg/hour; and pellets of the resin composition were produced.

Using an injection molding machine (Si-50, Toyo Machinery & Metal Co., Ltd.), the obtained pellets were molded at a cylinder temperature of 260° C. and a mold temperature of 80° C. to produce two of a black Molded Article Example 2 (Molded Article Example 2-1, Molded Article Example 2-2) having length 80 mm×width 20 mm×thickness 2 mm.

A step-shaped black molded plate 2K having length 80 mm×width 50 mm×thickness 1.5 mm and 1 mm for its two steps was also produced to provide a measurement test specimen for the converted absorbance a, incidence ratio, and color difference.

The converted absorbance a, incidence ratio K, and color difference ΔE00 were measured proceeding as in Example A1, and these results are given in Table 3.

Production of a Laser Butt-Welded Body

Using the two Molded Article Examples 2 (Molded Article Example 2-1, Molded Article Example 2-2), laser butt-welding was carried out as in Example A1 to obtain a laser-welded body. The weld strength was measured by carrying out the tensile test, and the results are given in Table 3.

Comparative Examples A3 and A4

In Comparative Examples A3 and A4, Comparative Molded Articles 3 and 4 according to Comparative Examples A3 and A4 were obtained proceeding as in Example A2, but changing the blend composition as indicated in Table 3. The color difference ΔE00, the converted absorbance a, and the incidence ratio K were measured proceeding as in Example A1, and these results are given in Table 3.

Using the obtained two Comparative Molded Articles, laser butt-welding was performed as in Example A2 to obtain laser-welded bodies. The weld strength was measured by carrying out the tensile test, and the results are given in Table 3.

Example A3

Production of Molded Article Example 3

The following were introduced into a stainless steel tumbler and were stirred and mixed for 1 hour: 70 mass parts of polybutylene terephthalate homopolymer (A1), 30 mass parts of polycarbonate resin (A2c) (IUPILON H4000), 0.1 mass parts of the phosphorus stabilizer (stabilizer 1, ADK STAB AX-71), 0.4 mass parts of the phenolic stabilizer (stabilizer 2), 0.7 mass parts of the mold release agent, 0.014 mass parts of nigrosine (NUBIAN BLACK TH-807), and 0.386 mass parts of Colorant Example 1. The resulting mixture was introduced into the main hopper of a 30-mm vented twin-screw extruder ("TEX30α", The Japan Steel Works, Ltd.); 43 mass parts of glass fiber (GF) was supplied from the 7th side feeder from the hopper; extrusion into strand form was carried out with kneading under the conditions of 260° C. for the extruder barrel set temperatures C1 to C15, 250° C. for the die, a screw rotation rate of 200 rpm, and an ejection rate of 40 kg/hour; and pellets of the resin composition were produced. Using an injection molding machine (Si-50, Toyo Machinery & Metal Co., Ltd.), the obtained pellets were molded at a cylinder temperature of 260° C. and a mold temperature of 80° C. to produce two of a black Molded Article Example 3 (Molded Article Example 3-1, Molded Article Example 3-2) having length 80 mm×width 20 mm×thickness 2 mm. A step-shaped black molded plate 3K having length 80 mm×width 50 mm×thickness 1.5 mm and 1 mm for its two steps was also produced to provide a measurement test specimen for the converted absorbance a, incidence ratio, and color difference.

The converted absorbance a, incidence ratio K, and color difference ΔE00 were measured proceeding as in Example A1, and these results are given in Table 3.

Production of a Laser Butt-Welded Body

Using the two Molded Article Examples 3 (Molded Article Example 3-1, Molded Article Example 3-2), laser butt-welding was carried out as in Example A1 to obtain a laser-welded body. The weld strength was measured by carrying out the tensile test, and the results are given in Table 3.

Comparative Examples A5 and A6

Comparative Molded Articles 5 and 6 according to Comparative Examples A5 and A6 were obtained proceeding as in Example A3, but changing the blend composition as indicated in Table 3. The color difference ΔE00, the converted absorbance a, and the incidence ratio K were measured proceeding as in Example A1, and these results are given in Table 3.

Using the obtained two Comparative Molded Articles, laser butt-welding was performed as in Example A3 to obtain the laser-welded body. The weld strength was measured by carrying out the tensile test, and the results are given in Table 3.

TABLE 3

| | | Ex A1 | Comp. Ex A1 | Comp. Ex A2 | Ex A2 | Comp. Ex A3 | Comp. Ex A4 | Ex A3 | Comp. Ex A5 | Comp. Ex A6 |
|---|---|---|---|---|---|---|---|---|---|---|
| | | \multicolumn{10}{c}{Molded Article Example No.} |
| | | Molded Article Example | Comp. Molded Article Example | | Molded Article Example | Comp. Molded Article Example | | Molded Article Example | Comp. Molded Article Example | |
| | | 1 | 1 | 2 | 2 | 3 | 4 | 3 | 5 | 6 |
| Compositional ratio (mass parts) | PBThomo (A1) | 50 | 50 | 50 | 60 | 60 | 60 | 70 | 70 | 70 |
| | PBTco (A2a) | 50 | 50 | 50 | | | | | | |

TABLE 3-continued

| | | Ex A1 | Comp. Ex A1 | Comp. Ex A2 | Ex A2 | Comp. Ex A3 | Comp. Ex A4 | Ex A3 | Comp. Ex A5 | Comp. Ex A6 |
|---|---|---|---|---|---|---|---|---|---|---|
| | | Molded Article Example 1 | Comp. Molded Article Example 1 | Comp. Molded Article Example 2 | Molded Article Example 2 | Comp. Molded Article Example 3 | Comp. Molded Article Example 4 | Molded Article Example 3 | Comp. Molded Article Example 5 | Comp. Molded Article Example 6 |
| | PET (A2b) | | | | 40 | 40 | 40 | | | |
| | PC (A2c) | | | | | | | 30 | 30 | 30 |
| | GF | 43 | 43 | 43 | 43 | 43 | 43 | 43 | 43 | 43 |
| | Stab 1 | | | | | | | 0.1 | 0.1 | 0.1 |
| | Stab 2 | 0.4 | 0.4 | 0.4 | 0.4 | 0.4 | 0.4 | 0.4 | 0.4 | 0.4 |
| | MR | 0.7 | 0.7 | 0.7 | 0.7 | 0.7 | 0.7 | 0.7 | 0.7 | 0.7 |
| | Colorant Example 1 | 0.386 | | | 0.386 | | | 0.386 | | |
| | Comp. Colorant Example 1 | | 0.386 | | | 0.386 | | | 0.386 | |
| | Comp. Colorant Example 2 | | | 0.386 | | | 0.386 | | | 0.386 |
| | Nigrosine | 0.014 | 0.014 | 0.014 | 0.014 | 0.014 | 0.014 | 0.014 | 0.014 | 0.014 |
| Converted absorbance a | | 0.69 | 0.67 | 0.66 | 0.28 | 0.29 | 0.29 | 0.53 | 0.55 | 0.51 |
| Incidence ratio K (%) | | 60.1 | 60.9 | 60.5 | 44.6 | 44.9 | 45.0 | 50.2 | 51.5 | 49.3 |
| color difference ΔE00 | | 1.28 | 4.51 | 4.44 | 2.93 | 5.22 | 3.30 | 3.05 | 5.86 | 4.87 |
| Laser welding | Scanning speed (mm/sec) | | 11 | | | 13 | | | 13 | |
| | Irradiated E (J/mm) | | 4.55 | | | 3.85 | | | 3.85 | |
| | Weld strength (N) | 889 | 724 | 777 | 543 | 465 | 497 | 419 | 396 | 304 |

Table 3 demonstrates that each of Examples A1 to A3, which use the composition of the present invention, provides an excellent laser weld strength and a small value for the color difference ΔE00 and an excellent black color.

Example B1

Production of Molded Article Example 4

The following were used: 294 mass parts of polybutylene terephthalate homopolymer (A1), 126 mass parts of polycarbonate resin (A2c), and 180 mass parts of glass fiber (GF), and, per the 600 mass parts of the total thereof, 0.06 mass parts of nigrosine (NUBIAN BLACK TH-807) and 1.80 mass parts of Colorant Example 1. These raw materials, excluding the glass fiber, were introduced into a stainless steel tumbler and were stirred and mixed for 1 hour. The resulting mixture was introduced into the main hopper of a 30-mm vented twin-screw extruder ("TEX30α", The Japan Steel Works, Ltd.); the glass fiber was supplied from the 7th side feeder from the hopper; extrusion into strand form was carried out with kneading under the conditions of 260° C. for the extruder barrel set temperatures C1 to C15, 250° C. for the die, a screw rotation rate of 200 rpm, and an ejection rate of 40 kg/hour; and pellets of the resin composition were produced. Using an Si-50 injection molding machine, the obtained pellets were molded by an ordinary method at a cylinder temperature of 260° C. and a mold temperature of 80° C. to produce two of a black Molded Article Example 4 (Molded Article Example 4-1, Molded Article Example 4-2) having length 80 mm×width 20 mm×thickness 2 mm.

To provide a measurement test specimen for the converted absorbance a and the incidence ratio, a step-shaped black molded plate 4K having length 80 mm×width 50 mm×thickness 1.5 mm and 1 mm for its two steps was produced under the same conditions of a cylinder temperature of 260° C. and a mold temperature of 80° C. The transmittance, reflectance, incidence ratio K, and converted absorbance a were as follows.

Transmittance: 64.3%, reflectance: 9.2%, incidence ratio K: 26.5%, converted absorbance: 0.14

Production of Laser Butt-Welded Body

The two Molded Article Examples 4 (Molded Article Example 4-1, Molded Article Example 4-2) were as such brought into abutting contact as shown in FIG. 2, and an integrated laser-welded body was obtained when exposure was carried out by scanning 15 mm along the interface between the abutted molded articles 1 and 2 using a laser beam 4 provided by a diode laser having an output of 50 W [wavelength: 940 nm, continuous] (from Fine Device Co., Ltd.) and changing the scanning speed to the scanning speed (mm/sec) given in Table 4. The weld strength was measured by performing the tensile test, and this result is given in Table 4.

TABLE 4

| Example No. Molded article Example | | Example B1 Molded Article Example 4 |
|---|---|---|
| Scanning speed (mm/sec) | Irradiation E (J/mm) | Weld strength (N) |
| 9 | 5.56 | 383 |
| 8 | 6.25 | 879 |

TABLE 4-continued

| Example No. Molded article Example | | Example B1 Molded Article Example 4 |
| --- | --- | --- |
| Scanning speed (mm/sec) | Irradiation E (J/mm) | Weld strength (N) |
| 7 | 7.14 | 997 |
| 6 | 8.33 | 1055 |
| 5 | 10.0 | 1203 |
| 4 | 12.5 | 1207 |
| 3 | 16.7 | 562 |
| 2 | 25.0 | 247 |

Examples C1 to C5 and Comparative Examples C1 to C8

The components described in Table 1 and Table 2 and nigrosine (NUBIAN BLACK TH-807) were blended in the amounts (mass parts in all instances) given in Table 5; this was introduced into the main hopper of a 30-mm vented twin-screw extruder ("TEX30α", The Japan Steel Works, Ltd.); the glass fiber was supplied from the 7th side feeder from the hopper; extrusion into strand form was carried out with kneading under the conditions of 260° C. for the extruder barrel set temperatures C1 to C15, 250° C. for the die, a screw rotation rate of 200 rpm, and an ejection rate of 40 kg/hour; and pellets of the resin composition were produced.

Using a differential scanning calorimeter (DSC) ("Pyris Diamond", PerkinElmer Inc.), the crystallization temperature (Tc) of the resin compositions was measured as the peak top temperature (unit: ° C.) of the exothermic peak observed during heating from 30° C. to 300° C. at a ramp rate of 20° C./min, maintaining for 3 minutes at 300° C., and cooling at a ramp down rate of 20° C./min.

It is thought that, because solidification is slower at a lower crystallization temperature (Tc), the laser weld strength is higher.

The resin composition pellets obtained as described above were dried for 5 hours at 120° C., and, using an injection molding machine (NEX80-9E, Nissei Plastic Industrial Co., Ltd.), a 1.0 mm-thick ASTM No. 4 dumbbell specimen and a 1.5 mm-thick ASTM No. 4 dumbbell specimen were then produced at a cylinder temperature of 255° C. and a mold temperature of 65° C. using conditions of an injection velocity of 100 mm/sec, an injection rate of 66 cm³/sec, and a surface progression factor of 880 cm³/sec·cm. In addition, using an injection molding machine (Si-50, Toyo Machinery & Metal Co., Ltd.), a step-shaped plate having length 80 mm×width 50 mm×thickness 1.5 mm and 1 mm for its two steps was produced at a cylinder temperature of 260° C. and a mold temperature of 80° C. under conditions of an injection velocity of 120 mm/sec, an injection rate of 51 cm³/sec, and a surface progression factor of 405 cm³/sec·cm.

In the C Examples, the 1-mm dumbbell specimen was used for measurement of the transmittance, reflectance, converted absorbance, and color, and the 1.5-mm dumbbell specimen and the stepped plate were respectively used for measurement of the laser weld strength.

[Measurement of the Transmittance, Reflectance, and Converted Absorbance]

Using an ultraviolet-visible-near infrared spectrophotometer ("UV-3100PC", Shimadzu Corporation), the transmittance T (%) and reflectance R (%) at a wavelength of 940 nm were determined at the region to be welded on the opposite side to the gate of the 1 mm-thick ASTM No. 4 dumbbell.

The absorbance a was determined using the formula:

$$a=-\log\{T/(100-R)\}.$$

[Determination of the Incidence Ratio]

The incidence ratio K (unit: %) was determined using the following formula:

$$\text{Incidence ratio } K \text{ (\%)}=100-\text{transmittance}-\text{reflectance}$$

The incidence ratio K is the incidence ratio for laser at a wavelength of 940 nm for a molded article with a thickness of 1 mm. For the ASTM No. 4 dumbbell (1 mm) molded article, it was derived from the measurement results for the transmittance and reflectance at a position on the opposite side to the gate (position which is on the side opposing the gate through which the resin is introduced).

[Laser Welding and Weld Strength Test]

The welding conditions are as follows.
Device used: FD2230, from Fine Device Co., Ltd.
Laser wavelength: 940 nm
Laser spot diameter: 2.1 mmØ
Distance between laser head and test specimen: 75 mm
Overlap pressure applied to molded articles: 2 MPa
Laser scanning speed: 10 mm/sec
Laser scanning distance: 16 mm
The laser output was varied as indicated in Table 5.

Using a Model 5544 Multipurpose Tester from Instron Corporation, the weld strength (unit: N) was determined on the welded body using conditions of a span width: 160 mm and tensile rate: 5 mm/min.

Weldability means not only that a high weld strength is obtained, but also that a high weld strength is maintained regardless of the conditions, and that the window for the laser welding conditions is broad, and is evaluated as excellence in laser weldability.

Laser Weldability Evaluation 1 (Lap-Welding of Plate-Shaped Test Specimens):

The laser weldability (weld strength test) was evaluated by overlapping, as in FIG. 3, the 1.5 mm-thick regions of two of the two-step plates composed of the same composition and obtained as described above.

Laser Weldability Evaluation 2 (Lap-Welding of Dumbbell Specimens):

The laser weldability (weld tensile strength) was evaluated by overlapping, as in FIG. 3, the ends on the opposite side to the gate of two of the No. 4 dumbbell specimens (1.5 mm thickness) composed of the same composition and obtained as described above.

Gap Weld Strength:

Two 1.5 mm-thick ASTM No. 4 dumbbells 11, 12, composed of the same composition and obtained as described above, were used. The ends on the opposite side to the gate of the dumbbell 11 and the dumbbell 12 were overlapped one over the other, as shown in FIG. 5, with the metal spacers 15, 15' sandwiched at the resulting overlap region 14, and this was mounted on a glass platform (not shown). A glass plate 16 was placed on the dumbbells 11, 12, and, while applying a pressure of 2 MPa from above, welding was performed by irradiation with a laser beam 17 at a laser output of 80 W and a laser scanning speed of 10 mm/sec. The gap distance produced here by the metal spacers 15, 15' was varied from 0 mm to 0.8 mm as indicated in Table 5. In addition, the load (unit: N) at rupture was determined by applying a load in the tensile direction shown by the arrow a in the figure.

Color:

Using a "CM-3600d" from Konica Minolta, Inc. (light source: D65, observation: 10°, geometry: SCE, 8 mm target mask), the color difference was measured at the end on the opposite side to the gate of the ASTM No. 4 dumbbell (1.0 mm thickness) having the composition obtained as described above, and ΔE00 and ΔE were determined with reference to the aforementioned STD•BK standard molded plate for measurement of the color difference.

The results are given in the following Table 5.

Examples D1 to D7 and Comparative Examples D1 to D5

[Production of Molded Article for Laser Butt-Welding]

The components described in Table 1 and Table 2 and nigrosine (NUBIAN BLACK TH-807) were blended in the amounts (mass parts in all instances) given in Table 6; this was introduced into the main hopper of a 30-mm vented twin-screw extruder ("TEX30α", The Japan Steel Works, Ltd.); the glass fiber was supplied from the 7th side feeder

TABLE 5

| Example | | Ex C1 | Comp. Ex C1 | Ex C2 | Comp. Ex C2 | Ex C3 | Com. Ex C3 | Ex C4 | Comp. Ex 4 | Ex C5 | Comp. Ex C5 | Comp. Ex C6 | Comp. Ex C7 | Comp. Ex C8 |
|---|---|---|---|---|---|---|---|---|---|---|---|---|---|---|
| Compositional ratio (mass parts) | PBThomo (A1) | 80 | 80 | 50 | 50 | 20 | 20 | 70 | 70 | 70 | 70 | 100 | 100 | 100 |
| | PBTCO (A2a) | 20 | 20 | 50 | 50 | 80 | 80 | | | | | | | |
| | PET (A2b) | | | | | | | 30 | 30 | | | | | |
| | PC (A2c) | | | | | | | | | 30 | 30 | | | |
| | GF | 43 | 43 | 43 | 43 | 43 | 43 | 43 | 43 | 43 | 43 | 43 | 43 | 43 |
| | Colorant Example 1 | 0.386 | | 0.386 | | 0.386 | | 0.386 | | 0.386 | | 0.386 | | |
| | Comp. Colorant Example 2 | | 0.386 | | 0.386 | | 0.386 | | 0.386 | | 0.386 | | 0.386 | |
| | Comp. Colorant Example 3 | | | | | | | | | | | | | 0.275 |
| | Nigrosine | 0.014 | 0.014 | 0.014 | 0.014 | 0.014 | 0.014 | 0.014 | 0.014 | 0.014 | 0.014 | 0.014 | 0.014 | 0.014 |
| | Stab 1 | | | | | | | 0.1 | 0.1 | 0.1 | 0.1 | | | |
| | Stab 2 | 0.4 | 0.4 | 0.4 | 0.4 | 0.4 | 0.4 | 0.4 | 0.4 | 0.4 | 0.4 | 0.4 | 0.4 | 0.4 |
| | MR | 0.7 | 0.7 | 0.7 | 0.7 | 0.7 | 0.7 | 0.7 | 0.7 | 0.7 | 0.7 | 0.7 | 0.7 | 0.7 |
| DSC | | | | | | | | | | | | | | |
| Crystallization temp. Tc (° C.) | | 182 | 180 | 175 | 180 | 166 | 169 | 169 | 170 | 166 | 174 | 186 | 187 | 195 |
| Optical characteristics (dumbbell shape) | | | | | | | | | | | | | | |
| Transmittance (%) | | 26.0 | 24.6 | 23.8 | 23.8 | 21.4 | 21.4 | 22.2 | 22.2 | 67.5 | 65.4 | 18.2 | 17.1 | 14.2 |
| Reflectance (%) | | 23.8 | 22.6 | 22.2 | 22.4 | 22.9 | 22.1 | 23.8 | 24.0 | 7.5 | 8.3 | 32.3 | 32.4 | 37.4 |
| Converted absorbance a | | 0.47 | 0.50 | 0.51 | 0.51 | 0.56 | 0.56 | 0.53 | 0.53 | 0.14 | 0.15 | 0.57 | 0.60 | 0.64 |
| Incidence ratio K | | 50.2 | 52.8 | 54.0 | 53.8 | 55.7 | 56.5 | 54.0 | 53.8 | 25.0 | 26.3 | 49.5 | 50.5 | 48.4 |
| Laser weldability evaluation 1 (plate shape) (unit: N) | | | | | | | | | | | | | | |
| 60 W-10 mm/s | | — | — | 566 | 452 | — | — | — | — | — | — | — | — | — |
| 70 W-10 mm/s | | — | — | 921 | 465 | — | — | 667 | 571 | — | — | 467 | 744 | — |
| 80 W-10 mm/s | | — | — | 744 | 682 | — | — | 750 | 456 | 752 | 759 | 871 | 337 | — |
| 90 W-10 mm/s | | — | — | — | — | — | — | 638 | — | 763 | 455 | — | — | — |
| 120 W-10 mm/s | | — | — | — | — | — | — | — | — | — | — | — | — | — |
| Laser weldability evaluation 2 (dumbbell shape) (unit: N) | | | | | | | | | | | | | | |
| 60 W-10 mm/s | | 365 | 224 | 544 | 516 | 584 | 561 | 406 | 374 | — | — | 200 | 266 | 184 |
| 70 W-10 mm/s | | 696 | 541 | 745 | 736 | 780 | 740 | 736 | 673 | 348 | — | 566 | 531 | 420 |
| 80 W-10 mm/s | | 829 | 798 | 872 | 840 | 828 | 796 | 826 | 762 | 627 | 345 | 712 | 822 | 632 |
| 90 W-10 mm/s | | — | — | — | — | — | — | — | — | 798 | 455 | 939 | — | — |
| 120 W-10 mm/s | | — | — | — | — | — | — | — | — | 910 | 700 | 876 | — | — |
| Gap weld strength (dumbbell shape) (unit: N) | | | | | | | | | | | | | | |
| 0.0 mm gap | | 829 | 798 | 872 | 840 | 828 | 796 | 826 | 762 | 627 | 345 | 712 | 822 | 632 |
| 0.1 mm gap | | 810 | 772 | 872 | 821 | 821 | 782 | 802 | 723 | 422 | 242 | 710 | 728 | 322 |
| 0.3 mm gap | | 803 | 724 | 870 | 811 | 822 | 772 | 782 | 723 | — | — | 708 | 642 | — |
| 0.6 mm gap | | 782 | 721 | 819 | 803 | 823 | 753 | 672 | 642 | — | — | 354 | 223 | — |
| 0.8 mm gap | | 643 | 612 | 809 | 782 | 822 | 712 | 333 | 321 | — | — | — | — | — |
| Color SCE | | | | | | | | | | | | | | |
| ΔE00 | | 5.50 | 6.05 | 4.63 | 5.61 | 4.29 | 5.46 | 5.51 | 6.20 | 4.88 | 4.98 | 5.70 | 5.97 | 6.20 |
| ΔE | | 7.77 | 7.86 | 6.62 | 7.24 | 6.15 | 7.17 | 7.86 | 8.11 | 7.04 | 7.06 | 8.11 | 7.91 | 6.70 | from the hopper; extrusion into strand form was carried out with kneading under the conditions of 260° C. for the extruder barrel set temperatures C1 to C15, 250° C. for the die, a screw rotation rate of 200 rpm, and an ejection rate of 40 kg/hour; and pellets of the resin composition were produced.

Using a differential scanning calorimeter (DSC) ("Pyris Diamond", PerkinElmer Inc.), the crystallization temperature (Tc) of the resin compositions was measured as the peak top temperature (unit: ° C.) of the exothermic peak observed during heating from 30° C. to 300° C. at a ramp rate of 20° C./min, holding for 3 minutes at 300° C., and cooling at a ramp down rate of 20° C./min.

It is thought that, because solidification is slower at a lower crystallization temperature (Tc), the laser weld strength and weld strength are also higher.

The resin composition pellets obtained as described above were dried for 5 hours at 120° C., and, using an injection molding machine (NEX80-9E, Nissei Plastic Industrial Co., Ltd.), 1.0 mm-thick and 2.0 mm-thick ASTM No. 4 dumbbell specimens were then produced at a cylinder temperature of 255° C. and a mold temperature of 65° C. using conditions of an injection velocity of 100 mm/sec, an injection rate of 66 cm$^3$/sec, and a surface progression factor of 880 cm$^3$/sec·cm.

[Optical Characteristics: Measurement of the Transmittance, Reflectance, and Converted Absorbance]

Using an ultraviolet-visible-near infrared spectrophotometer ("UV-3100PC", Shimadzu Corporation), the transmittance T (%) and reflectance R (%) at a wavelength of 940 nm were determined at the region to be welded on the opposite side to the gate of the ASTM No. 4 dumbbell. The absorbance a was determined using the formula: a=–log {T/(100–R)}, and the converted absorbance converted to a thickness of 1 mm was determined as a/t using the thickness t (mm) of the measured location.

[Determination of the Incidence Ratio]

The incidence ratio K (unit: %) was determined using the following formula:

Incidence ratio $K$ (%)=100−transmittance−reflectance

The incidence ratio K is the incidence ratio for laser of a wavelength of 940 nm for a molded article with a thickness of 1 mm. For the ASTM No. 4 dumbbell (1 mm) molded article, it was derived from the measurement results for the transmittance and reflectance at a position on the opposite side to the gate (position which is on the side opposing the gate through which the resin is introduced).

Laser Weldability (Butt-Welding of Dumbbell Specimens, Gap Weld Strength):

Two 2 mm-thick ASTM No. 4 dumbbells 11, 12, composed of the same composition and obtained as described above, were used, and a laser welding device from Fine Device Co., Ltd. (laser wavelength: 940 nm, laser spot diameter: 2.1 mmØ, distance between laser head and test specimen: 79.7 mm) was used. The ends on the sides opposite from the resin introduction gate (opposite side to the gate) of the dumbbell 11 and the dumbbell 12 were abutted to each other, as shown in FIG. 4, with the metal spacers 15, 15' sandwiched in this abutting region 13, and this was mounted on a glass platform (not shown). A glass plate 16 was placed on the dumbbells 11, 12, and, while applying a pressure of 0.4 MPa from the horizontal, welding was performed by irradiation with a laser beam 17 at a laser output of 200 W, a laser scanning speed of 20 mm/sec, and a laser scanning distance of 16 mm. The gap distance produced here by the metal spacers 15, 15' was varied from 0 mm to 0.8 mm as indicated in Table 6. In addition, using a Model 5544 Multipurpose Tester from Instron Corporation, the load (unit: N) at rupture was determined by applying a load in the tensile direction shown by the arrow a in the figure under conditions of a span width of 160 mm and tensile rate of 5 mm/min.

Weldability means not only that a high weld strength is obtained, but also that a high weld strength is maintained regardless of the conditions, and that the window for the laser welding conditions is broad, and is evaluated as excellence in laser weldability.

Weld Strength:

Proceeding as in the molding of the ASTM No. 4 dumbbell described above, the resin was injected with a two-point gate from the longitudinal direction on both sides of the test specimen, for a 1.6 mm-thick UL94 (Underwriters Laboratories Subject 94) flame retardancy test specimen, in order to injection-mold a 1.6 mm-thick UL94 flame retardancy test specimen wherein the weld line was formed in the middle of the test specimen. This was subjected to measurement of the weld bending strength (unit: MPa) under conditions of a span width of 40 mm and test rate of 2 mm/min.

The results are reported in the following Table 6.

TABLE 6

| | | Example | | | | | | | Comp. Ex D1 | Comp. Ex D2 | Comp. Ex D3 | Comp. Ex D4 | Comp. Ex D5 |
| | | Ex D1 | Ex D2 | Ex D3 | Ex D4 | Ex D5 | Ex D6 | Ex D7 | | | | | |
|---|---|---|---|---|---|---|---|---|---|---|---|---|---|
| Compositional ratio (mass parts) | PBThomo (A1) | 50 | 80 | 20 | 70 | 90 | 70 | 90 | 100 | 100 | 70 | 60 | 70 |
| | PBTco (A2a) | 50 | 20 | 80 | | | | | | | | | |
| | PET (A2b) | | | | 30 | 10 | | | | | 30 | | |
| | PC (A2c) | | | | | | 30 | 10 | | | | | |
| | HIPS (A2d) | | | | | | | | | | | 30 | |
| | mPS (A2d) | | | | | | | | | | | 10 | |
| | AS (A2d) | | | | | | | | | | | | 30 |
| | GF | 43 | 43 | 43 | 43 | 43 | 43 | 43 | 43 | 43 | 43 | 43 | 43 |
| | Colorant Example 1 | 0.386 | 0.386 | 0.386 | 0.386 | 0.386 | 0.386 | 0.386 | 0.386 | | 0.386 | 0.386 | |

TABLE 6-continued

| | Example | | | | | | | Comp. Ex D1 | Comp. Ex D2 | Comp. Ex D3 | Comp. Ex D4 | Comp. Ex D5 |
|---|---|---|---|---|---|---|---|---|---|---|---|---|
| | Ex D1 | Ex D2 | Ex D3 | Ex D4 | Ex D5 | Ex D6 | Ex D7 | | | | | |
| Comp. Colorant Example 2 | | | | | | | | | | 0.386 | | |
| Comp. Colorant Example 3 | | | | | | | | | 0.275 | | | |
| Nigrosine | 0.014 | 0.014 | 0.014 | 0.014 | 0.014 | 0.014 | 0.014 | 0.014 | 0.014 | 0.014 | 0.014 | 0.014 |
| Stab 1 | | | | 0.1 | 0.1 | 0.1 | 0.1 | | | 0.1 | 0.1 | |
| Stab 2 | 0.4 | 0.4 | 0.4 | 0.4 | 0.4 | 0.4 | 0.4 | 0.4 | 0.4 | 0.4 | 0.4 | 0.4 |
| MR | 0.7 | 0.7 | 0.7 | 0.7 | 0.7 | 0.7 | 0.7 | 0.7 | 0.7 | 0.7 | 0.7 | 0.7 |
| DSC | | | | | | | | | | | | |
| Crystallization temp. Tc (° C.) | 178 | 182 | 170 | 178 | 182 | 175 | 183 | 187 | 195 | 178 | 190 | 187 |
| Optical characteristics (dumbbell shape) | | | | | | | | | | | | |
| Transmittance (%) | 14.4 | 13.3 | 20.8 | 27.3 | 22.4 | 61.6 | 32.2 | 17.7 | 14.2 | 33.5 | 18.1 | 14.9 |
| Reflectance (%) | 18.2 | 18.4 | 18.6 | 7.7 | 16.3 | 6.1 | 18.7 | 31.8 | 37.4 | 10.8 | 22.2 | 24.3 |
| Incidence ratio K (%) | 67.4 | 68.3 | 60.6 | 65.0 | 61.3 | 32.3 | 49.1 | 50.5 | 48.4 | 55.7 | 59.7 | 60.8 |
| Converted absorbance a | 0.75 | 0.79 | 0.59 | 0.53 | 0.57 | 0.18 | 0.40 | 0.59 | 0.64 | 0.43 | 0.63 | 0.71 |
| Laser weldability gap weld strength (dumbbell shape) (unit: N) | | | | | | | | | | | | |
| 0.0 mm gap | 511 | 487 | 643 | 433 | 422 | 421 | 421 | 412 | 372 | 424 | 343 | 395 |
| 0.1 mm gap | 412 | 350 | 532 | 301 | 312 | 300 | 310 | 320 | 289 | 299 | 247 | 276 |
| 0.3 mm gap | 393 | 298 | 432 | 299 | 287 | 287 | 278 | 268 | 254 | 289 | 221 | 262 |
| 0.6 mm gap | 277 | 186 | 342 | 145 | 134 | 142 | 143 | 152 | 142 | 138 | — | 131 |
| 0.8 mm gap | 184 | 145 | 201 | 172 | 153 | 176 | 154 | 125 | — | 165 | — | — |
| Weld strength (MPa) | 92 | 89 | 106 | 86 | 98 | 81 | 93 | 100 | 56 | 92 | 37 | 50 |

Examples E1 to E9, Comparative Example E1

The components described in Table 1 and Table 2 and nigrosine (NUBIAN BLACK TH-807) were blended in the amounts (mass parts in all instances) given in Table 7; this was introduced into the main hopper of a 30-mm vented twin-screw extruder ("TEX30α", The Japan Steel Works, Ltd.); the glass fiber was supplied from the 7th side feeder from the hopper; extrusion into strand form was carried out with kneading under the conditions of 260° C. for the extruder barrel set temperatures C1 to C7 and 220° C. for C8 to C15, 250° C. for the die, a screw rotation rate of 220 rpm, and an ejection rate of 40 kg/hour; and pellets of the resin composition were produced.

The crystallization temperature (Tc) of the resin compositions was measured as described above.

The resin composition pellets obtained as described above were dried for 5 hours at 120° C., and, using an injection molding machine (Si-50, Toyo Machinery & Metal Co., Ltd.), a step-shaped plate having length 80 mm×width 50 mm×thickness 1.5 mm and 1 mm for its two steps was then produced at a cylinder temperature of 260° C. and a mold temperature of 80° C. under conditions of an injection velocity of 120 mm/sec, an injection rate of 51 cm$^3$/sec, and a surface progression factor of 405 cm$^3$/sec·cm.

Using an ultraviolet-visible-near infrared spectrophotometer ("UV-3100PC", Shimadzu Corporation), the transmittance (unit: %) at a wavelength of 940 nm was determined at the region to be welded in the 1 mm-thick area of the two-step step-shaped plate obtained as described above.

[Measurement of the Transmittance, Reflectance, and Converted Absorbance]

Using an ultraviolet-visible-near infrared spectrophotometer ("UV-3100PC", Shimadzu Corporation), the transmittance T (%) and reflectance R (%) at a wavelength of 940 nm were determined at the 1 mm-thick region of the two-step step-shaped plate. The absorbance a was determined using the formula: $a = -\log\{T/(100-R)\}$

[Determination of the Incidence Ratio]

The incidence ratio K (unit: %) was determined using the following formula:

Incidence ratio $K$ (%) = 100 − transmittance − reflectance

The incidence ratio K is the incidence ratio for laser at a wavelength of 940 nm for a molded article with a thickness of 1 mm. For the two-step step-shaped plate molded article, it was derived from the measurement results for the transmittance and reflectance at the 1 mm-thick position on the opposite side to the gate (position on the side opposite to the gate through which the resin was introduced).

Laser Weldability (Lap-Welding of Plate-Shaped Test Specimens):

Two of the two-step plates composed of the same composition and obtained as described above were overlapped at their 1.5 mm-thick regions as shown in FIG. 3 and laser welding was performed.

Using a Model 5544 Multipurpose Tester from Instron Corporation, the load (unit: N) at which rupture occurred was determined on the resulting laser-welded body by applying a load in the tensile direction using conditions of a span width: 160 mm and a tensile rate of 5 mm/min.

The welding conditions are as follows.

Device used: FD2230, from Fine Device Co., Ltd.
Laser wavelength: 940 nm
Laser spot diameter: 2.1 mmØ
Distance between laser head and test specimen: 75 mm
Overlap pressure applied to molded articles: 2 MPa
Laser scanning speed: 10 mm/sec
Laser scanning distance: 16 mm
The laser output was varied as indicated in Table 7.

Laser Weldability (Lap-Welding of Plate-Shaped Test Specimens, Gap Weld Strength):

Two of the two-step plates composed of the same composition and obtained as described above were overlapped in their 1.5 mm-thick regions, and, proceeding as in FIG. 5, metal spacers were sandwiched in this overlap region and welding was carried out. The gap distance was varied from 0 mm to 0.3 mm according to the gap distance described in Table 7, and laser welding was performed using the laser welding conditions indicated below, a laser output of 80 W, and a laser scanning speed of 10 mm/sec. Using a Model 5544 Multipurpose Tester from Instron Corporation, the load (unit: N) at rupture was determined for the obtained welded body by applying a load in the tensile direction under conditions of a span width: 160 mm and tensile rate: 5 mm/min.

Weldability means not only that a high weld strength is obtained, but also that a high weld strength is maintained regardless of the conditions, and that the window for the laser welding conditions is broad, and is evaluated as excellence in laser weldability.

The welding conditions are as follows.
Device used: FD2230, from Fine Device Co., Ltd.
Laser wavelength: 940 nm
Laser spot diameter: 2.1 mmØ
Distance between laser head and test specimen: 75 mm
Overlap pressure applied to molded articles: 2 MPa
Laser scanning distance: 16 mm Color:

Using a "CM-3600d" from Konica Minolta, Inc. (light source: D65, observation: 10°, geometry: SCE, 8 mm target mask), the color difference was measured at the 1.0 mm-thick region of a two-step plate obtained as described above, and $\Delta E00$ and $\Delta E$ were determined with reference to the standard plate.

Color after Heat Treatment:

A two-step plate obtained as described above was held for 12 hours in a 140° C. convection oven. After this heat treatment, the color difference was measured as described above on the 1.0 mm-thick region of the plate and the $\Delta E$ of the color was determined pre-versus-post-heat treatment.

In addition, the hue post-heat treatment was determined as $\Delta E00$ versus the standard plate.

Bleed Out Test:

Using an NEX80-9E injection molding machine, polybutylene terephthalate resin (product name: NOVADURAN 5010R5 NA (natural color), Mitsubishi Engineering-Plastics Corporation) was molded at a cylinder temperature of 260° C. and a mold temperature of 80° C. into a polybutylene terephthalate (natural color) plate having length 100 mm×width 100 mm×thickness 3 mm. This was overlapped with a two-step plate obtained as described above and was fixed with a clip. After standing for 3 hours in a 140° C. convection oven, the status of dye transfer to the polybutylene terephthalate (natural color) plate was visually inspected and was scored according to the following evaluation results.

○: little dye transfer occurs
Δ: moderate dye transfer occurs
X: substantial dye transfer occurs The results are given in the following Table 7.

TABLE 7

| | Example | Ex E1 | Ex E2 | Ex E3 | Ex E4 | Ex E5 | Ex E6 | Ex E7 | Ex E8 | Ex E9 | Comp. Ex E1 |
|---|---|---|---|---|---|---|---|---|---|---|---|
| Compositional ratio (mass parts) | PBThomo (A1) | 50 | 50 | 50 | 50 | 50 | 50 | 50 | 50 | 50 | 50 |
| | PBTco (A2a) | 50 | 50 | 50 | 50 | 50 | 50 | 50 | 50 | 50 | 50 |
| | GF | 43 | 43 | 43 | 43 | 43 | 43 | 43 | 43 | 43 | 43 |
| | Colorant Example 1 | 0.386 | | | | | | | | | |
| | Colorant Example 2 | | 0.386 | | | | | | | | |
| | Colorant Example 3 | | | 0.386 | | | | | | | |
| | Colorant Example 4 | | | | 0.386 | | | | | | |
| | Colorant Example 5 | | | | | 0.386 | | | | | |
| | Colorant Example 6 | | | | | | 0.386 | | | | |
| | Colorant Example 7 | | | | | | | 0.386 | | | |
| | Colorant Example 8 | | | | | | | | 0.386 | | |
| | Colorant Example 9 | | | | | | | | | 0.386 | |
| | Comp. Colorant Example 2 | | | | | | | | | | 0.386 |
| | Nigrosine | 0.014 | 0.014 | 0.014 | 0.014 | 0.014 | 0.014 | 0.014 | 0.014 | 0.014 | 0.014 |
| | Stab 2 | 0.4 | 0.4 | 0.4 | 0.4 | 0.4 | 0.4 | 0.4 | 0.4 | 0.4 | 0.4 |
| | MR | 0.7 | 0.7 | 0.7 | 0.7 | 0.7 | 0.7 | 0.7 | 0.7 | 0.7 | 0.7 |
| DSC | | | | | | | | | | | |
| Crystallization temp. Tc (° C.) | | 178 | 176 | 176 | 178 | 178 | 178 | 178 | 178 | 177 | 180 |

TABLE 7-continued

| Example | Ex E1 | Ex E2 | Ex E3 | Ex E4 | Ex E5 | Ex E6 | Ex E7 | Ex E8 | Ex E9 | Comp. Ex E1 |
|---|---|---|---|---|---|---|---|---|---|---|
| Optical characteristics (plate shape) | | | | | | | | | | |
| Transmittance (%) | 13.1 | 13.8 | 14.4 | 13.9 | 14.4 | 14.7 | 13.6 | 15.3 | 14.4 | 14.4 |
| Reflectance (%) | 24.0 | 22.3 | 21.8 | 22.0 | 21.3 | 22.0 | 24.8 | 21.4 | 21.3 | 21.3 |
| Converted absorbance a | 0.77 | 0.75 | 0.73 | 0.75 | 0.74 | 0.73 | 0.74 | 0.71 | 0.74 | 0.74 |
| Incidence ratio K | 62.9 | 64.0 | 63.8 | 64.1 | 64.4 | 63.4 | 61.6 | 63.2 | 64.3 | 64.3 |
| Laser weldability (plate shape) (unit: N) | | | | | | | | | | |
| 60 W-10 mm/s | 566 | 603 | 400 | 443 | 493 | 575 | 591 | 475 | 497 | 452 |
| 70 W-10 mm/s | 921 | 834 | 826 | 538 | 517 | 508 | 828 | 612 | 714 | 465 |
| 80 W-10 mm/s | 744 | 793 | 971 | 860 | 742 | 962 | 901 | 855 | 867 | 682 |
| Laser weldability gap weld strength (plate shape) (unit: N) | | | | | | | | | | |
| 0.0 mm gap | 744 | 793 | 971 | 860 | 742 | 962 | 901 | 855 | 867 | 682 |
| 0.3 mm gap | 721 | 743 | 883 | 821 | 732 | 911 | 882 | 832 | 853 | 582 |
| Color SCE (plate shape) | | | | | | | | | | |
| ΔE00 | 1.83 | 2.13 | 1.77 | 2.90 | 2.49 | 2.45 | 2.46 | 2.50 | 2.47 | 4.37 |
| ΔE | 2.34 | 2.61 | 2.48 | 3.07 | 2.83 | 2.42 | 2.59 | 3.24 | 2.74 | 3.41 |
| Color post-heat treatment (140° C. × 12 hr) SCE (plate shape) | | | | | | | | | | |
| ΔE00 | 0.66 | 1.26 | 0.84 | 1.71 | 1.24 | 1.57 | 2.00 | 1.91 | 1.81 | 3.04 |
| ΔE versus pre-treatment | 1.48 | 1.28 | 1.47 | 1.38 | 1.46 | 0.91 | 0.59 | 1.01 | 1.08 | 1.81 |
| Bleed out test (140° C. × 3 hr) | | | | | | | | | | |
| Evaluation of dye transferability | O | D | O | O | D | O | O | D | D | X |

INDUSTRIAL APPLICABILITY

The resin composition for laser welding of the present invention, in addition to having a high coloring property and a high heat resistance, has an extremely good laser-welding processability. Accordingly, the resin composition of the present invention can be broadly and advantageously applied to automotive components, components for electrical and electronic devices and instruments, and other materials and thus has a very high industrial applicability.

The invention claimed is:

1. A resin composition for laser welding, the composition comprising:
    (A) 100 mass parts of (A) a thermoplastic polyester resin material comprising a polybutylene terephthalate homopolymer and at least one of a polybutylene terephthalate copolymer, a polyethylene terephthalate resin, and a polycarbonate resin;
    (B) 0.0005 to 0.5 mass parts of (B) nigrosine; and
    (C) 0.01 to 2 mass parts of (C) a colorant comprising at least an anthraquinone dye C1 having a maximum absorption wavelength in a range of 590 to 635 nm, a perinone dye C2 having a maximum absorption wavelength in a range of 460 to 480 nm, and an anthraquinone dye C3 having a maximum absorption wavelength in a range of 435 to 455 nm, such that a mass ratio relative to 100 mass parts for a total of C1, C2 and C3 satisfies: C1:C2:C3=24 to 41:24 to 39:22 to 46.

2. The resin composition for laser welding according to claim 1, wherein (C) colorant comprises the perinone dye C2 having the maximum absorption wavelength in the range of 460 to 480 nm and the anthraquinone dye C1 having the maximum absorption wavelength in the range of 590 to 635 nm, in a proportion of C2/C1=0.61 to 1.50 as the mass ratio C2/C1.

3. The resin composition for laser welding according to claim 1, wherein the thermoplastic polyester resin material (A) comprises the polybutylene terephthalate homopolymer and the polybutylene terephthalate copolymer, and a content of the polybutylene terephthalate copolymer is 5 to 70 mass % relative to 100 mass % for a total of the polybutylene terephthalate homopolymer and the polybutylene terephthalate copolymer.

4. The resin composition for laser welding according to claim 1, wherein the thermoplastic polyester resin material (A) comprises the polybutylene terephthalate homopolymer and the polyethylene terephthalate resin, and a content of the polyethylene terephthalate resin is 5 to 50 mass % relative to 100 mass % for a total of the polybutylene terephthalate homopolymer and the polyethylene terephthalate resin.

5. The resin composition for laser welding according to claim 1, wherein the thermoplastic polyester resin material (A) comprises the polybutylene terephthalate homopolymer and the polycarbonate resin, and a content of the polycarbonate resin is 5 to 50 mass % relative to 100 mass % for a total of the polybutylene terephthalate homopolymer and the polycarbonate resin.

6. The resin composition for laser welding according to claim 1, which has a converted absorbance a of 0.05 to 1 for 940 nm laser for a 1 mm-thick molded plate made from the resin composition.

7. The resin composition for laser welding according to claim 1, which has an incidence ratio K of 20% to 80% for 940 nm laser for a 1 mm-thick molded plate made from the resin composition, where the incidence ratio $K$ (%)=100−transmittance−reflectance.

8. A molded article for laser welding, the molded article comprising the resin composition for laser welding according to claim 1.

9. A laser-welded body of the molded article according to claim 8.

10. The laser-welded body according to claim 9, wherein a gap between molded articles at the time of welding is at least 0.1 mm for at least a welded portion in the welded body.

11. The laser-welded body according to claim 9, wherein the molded articles are butt-welded to each other.

12. The laser-welded body according to claim 9, wherein the molded articles are lap-welded to each other.

* * * * *